April 6, 1943.   A. G. B. METCALF   2,315,868
GRADING MACHINE
Filed Nov. 23, 1940   13 Sheets-Sheet 6

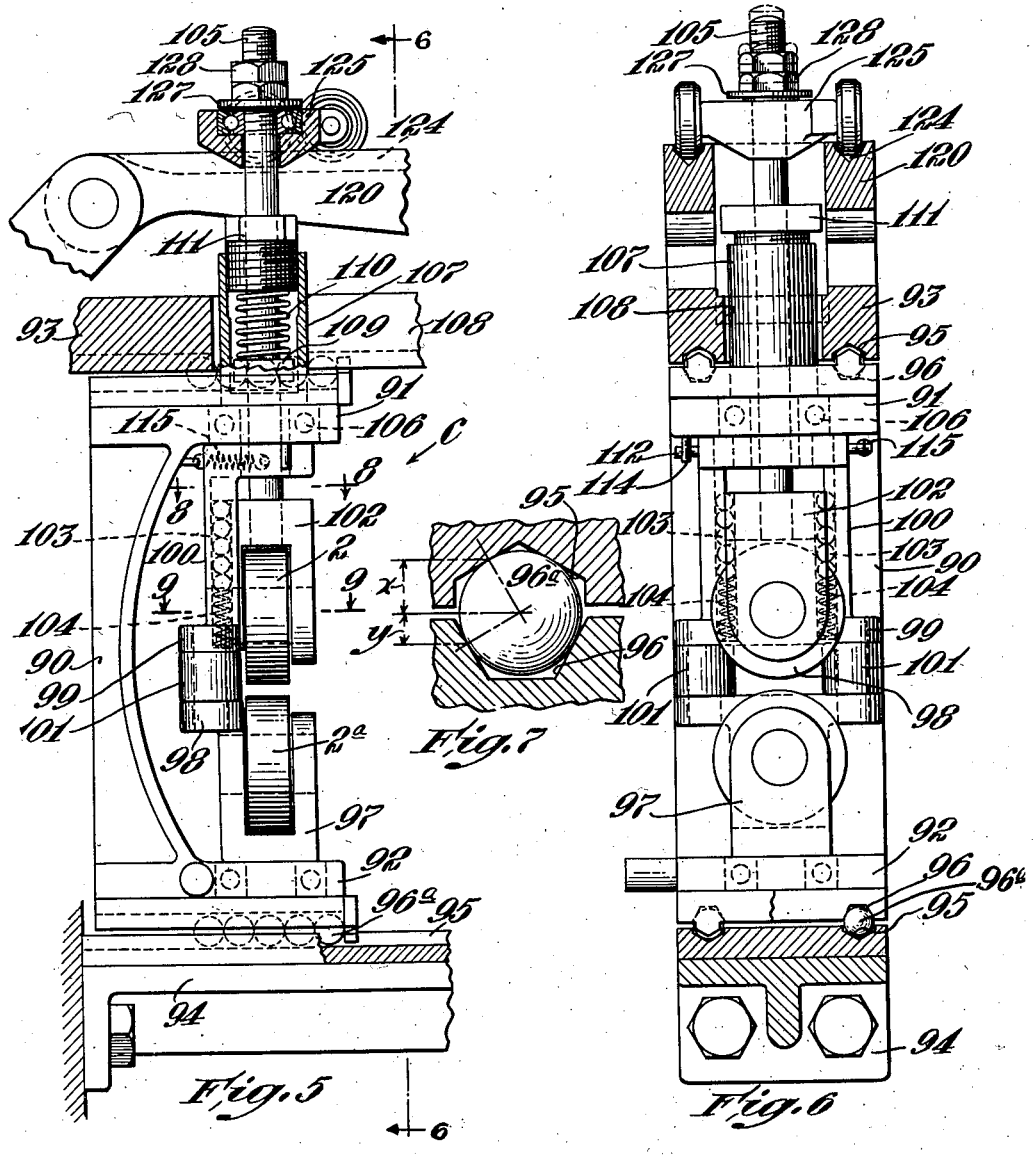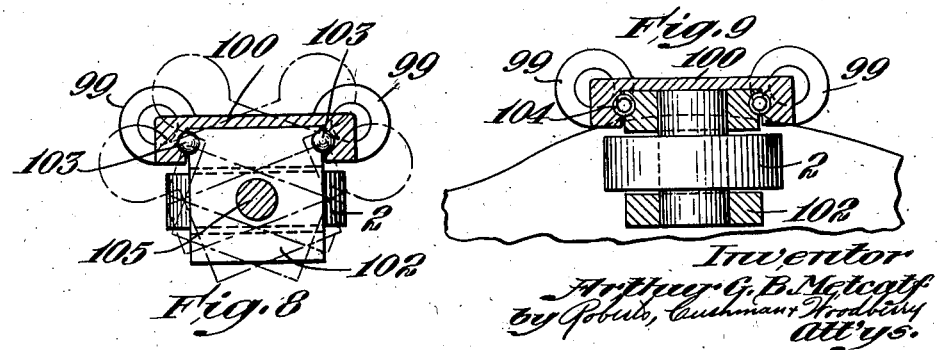

Inventor
Arthur G. B. Metcalf
by Roberts, Cushman & Woodbury
attys

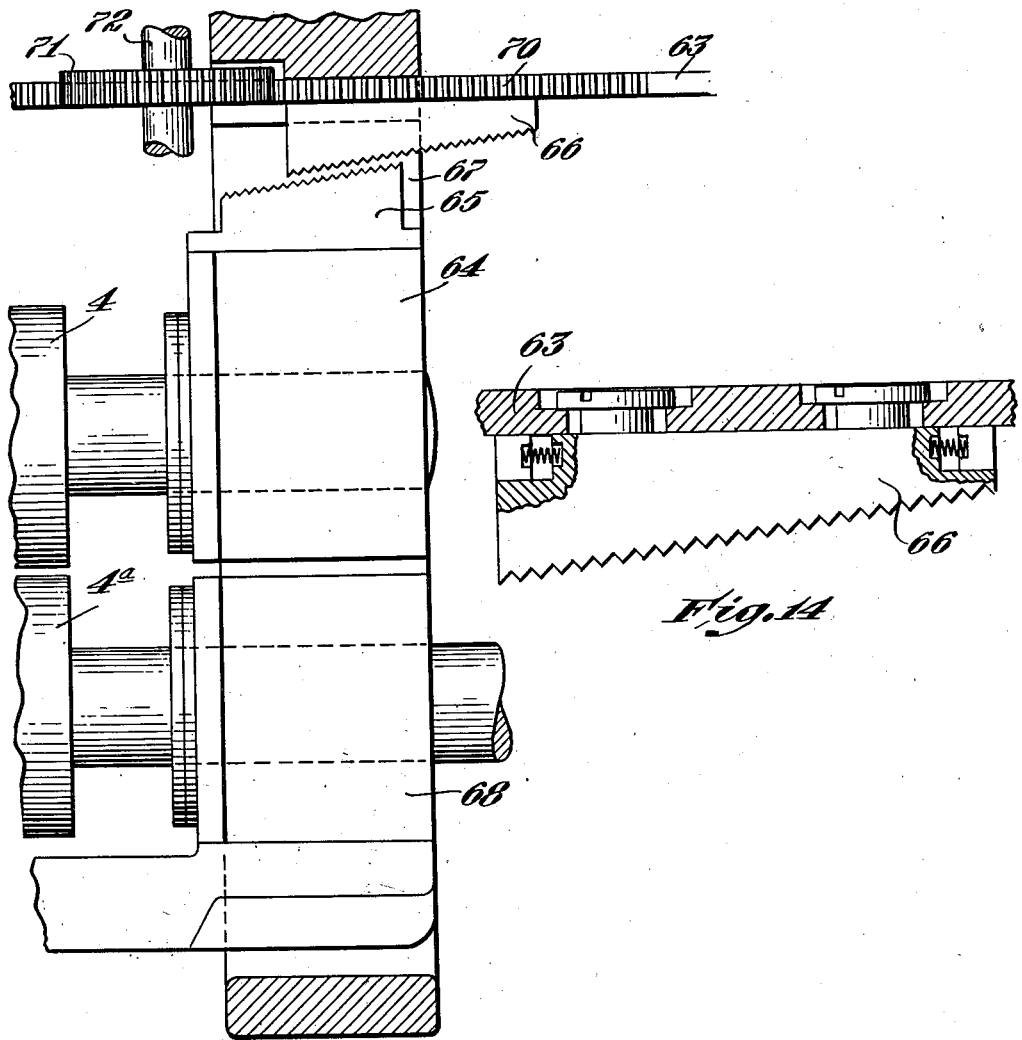

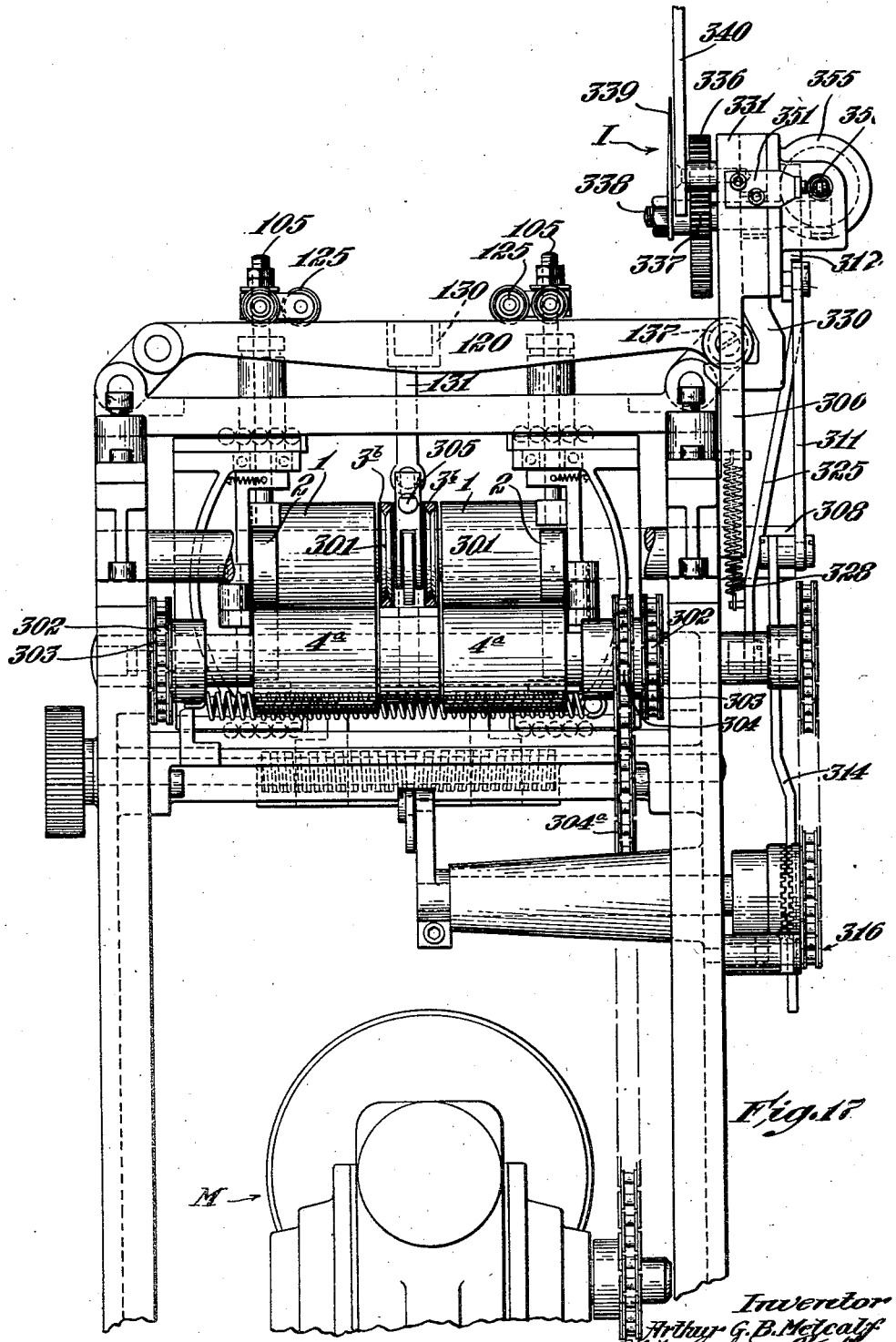

April 6, 1943.  A. G. B. METCALF  2,315,868
GRADING MACHINE
Filed Nov. 23, 1940   13 Sheets-Sheet 11
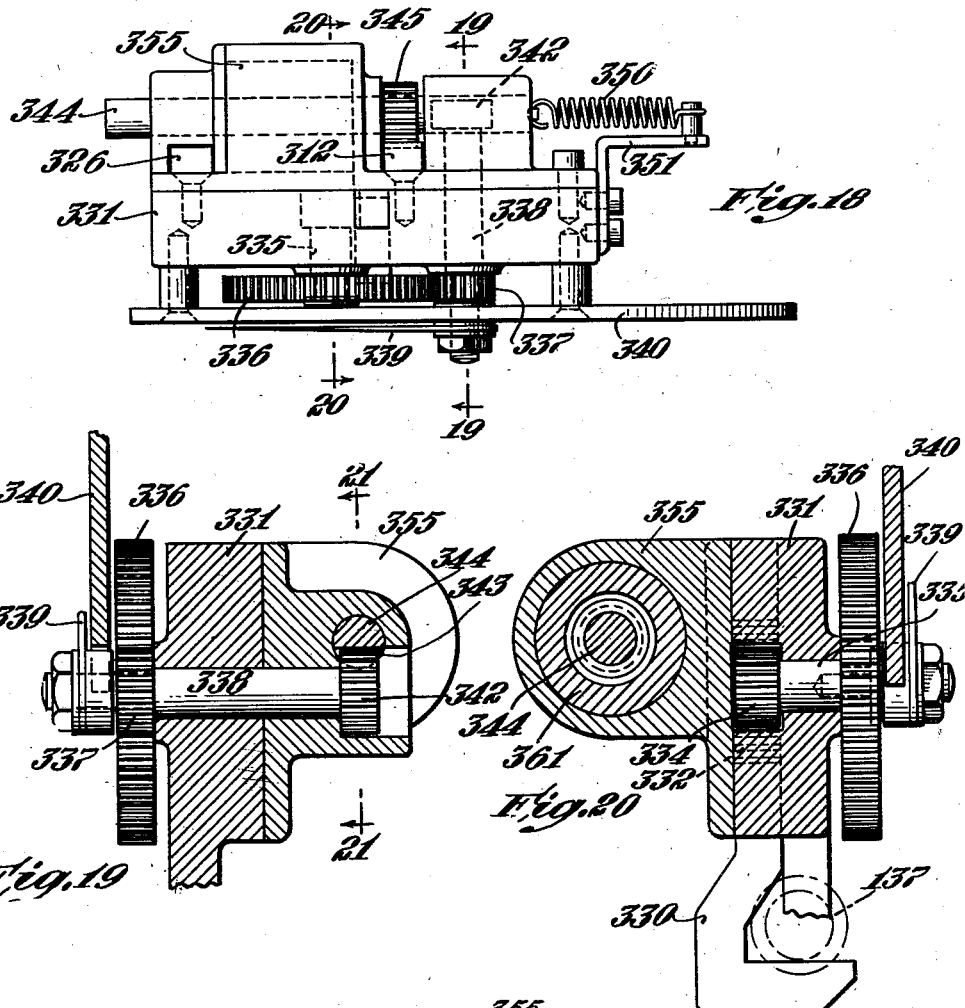
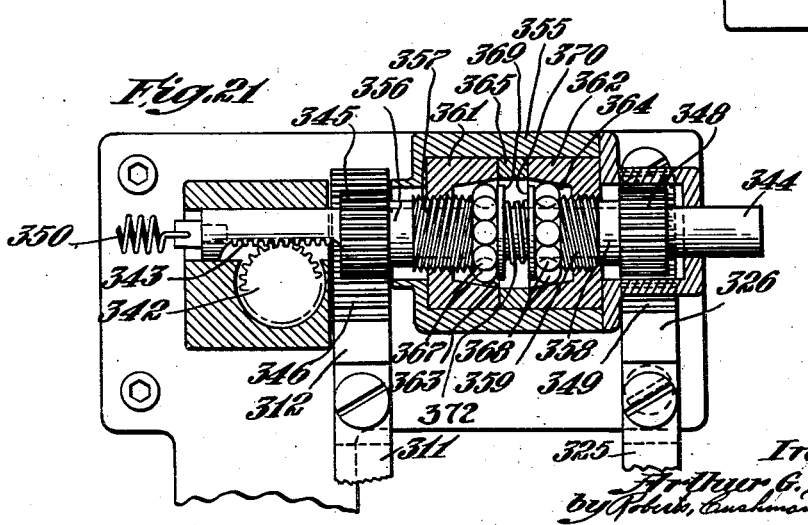

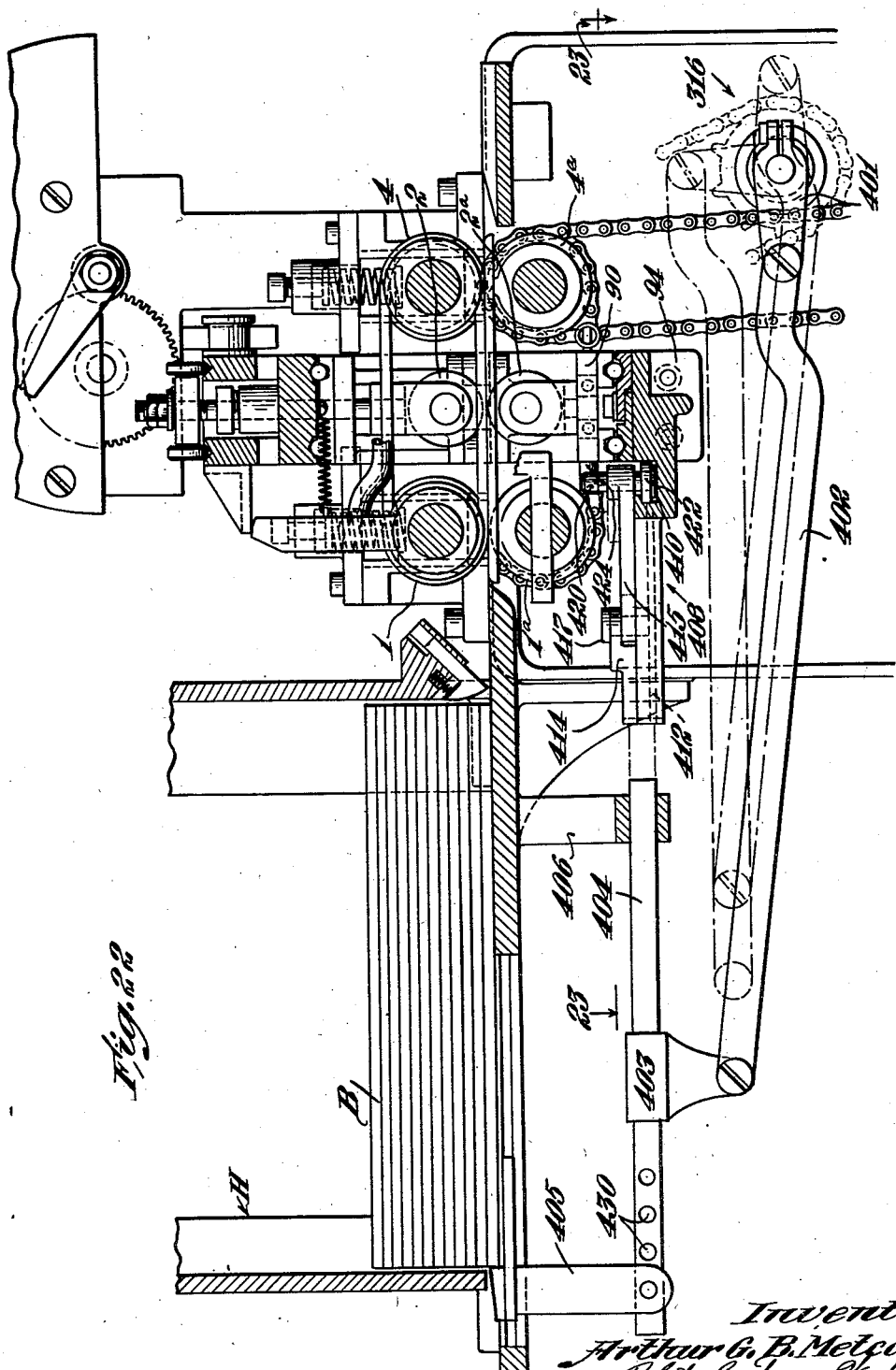

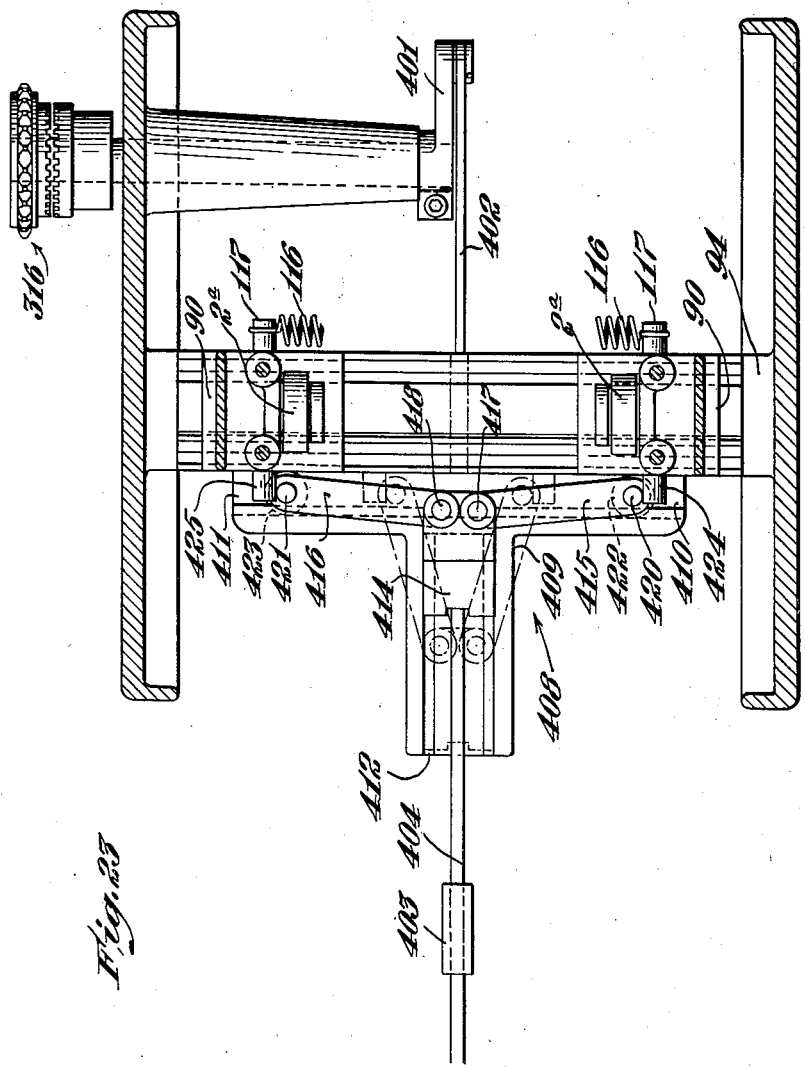

Patented Apr. 6, 1943

2,315,868

UNITED STATES PATENT OFFICE 2,315,868

GRADING MACHINE

Arthur G. B. Metcalf, Milton, Mass., assignor to North American Holding Corporation, Syracuse, N. Y., a corporation of New York Application November 23, 1940, Serial No. 366,853

28 Claims. (Cl. 33—147)

This invention relates to grading machines such as are used to grade shoe soles, taps and other blanks of stock used in the manufacture of shoes, and more particularly to the well-known Nichols type of grading machines illustrated in a series of patents granted to Elmer P. Nichols, Leander A. Cogswell and James W. Johnston of which the Johnston Patent No. 2,187,204, dated January 16, 1940, may be referred to as an example. A characteristic feature of such grading machines is that each blank is measured and graded in accordance with the thickness of the thinnest spot of the blank, or of a selected area of the blank, as determined by the detecting and measuring devices.

There are various kinds of grading operations performed by different species of grading mechanisms, and the term "grading," as established in this art, is a generic term and includes evening or skiving the blank as a whole down to the grade or thickness of its thinnest spot, stamping or marking each blank with a character indicating its thickness grade, indicating on a visual indicator the grades of the several blanks, and sorting or distributing the blanks in accordance with their grade measurements. Two or more species of grading mechanisms may be and commonly are contained in one machine and the term "grading" is used herein in its generic sense unless some particular kind of grading is specified. Whatever may be the kind or kinds of grading to be performed the appropriate grading mechanism or mechanisms are adjusted through setting and transmission mechanisms in response to and in accordance with the thickness grade of each blank as determined by the detecting and gauging or measuring device, which acts on each blank as successive blanks are passed one by one through the machine. The measurements are usually made in terms of "irons" (⅛s of an inch), and the measurement transmitted to the grading devices is usually the thickness measurement in irons or fractions of irons which is nearest to but not greater than the thickness of the thinnest part of the blank as determined by the measuring device. In the machines herein illustrated three species of grading mechanisms are shown, namely, an evening or skiving mechanism, a stamping or marking mechanism, and a visual indicator, but it will be understood that additional or different species of grading mechanisms might be used, such as distributors, and all such species are within the scope of the claims unless specifically restricted to some particular species of grading mechanism.

Grading machines of the aforesaid type usually include measurement transmitting mechanisms which involve translating a linear dimension or movement into a rotational or angular movement, thus introducing the usual cosine error, the magnitude of which depends upon the degree of amplification of the transmitted measurement and the range of thickness measurements which the machine is capable of measuring. Although it is possible to compensate for such errors, either by elaborate geometrical means or mechanically, as shown for example in United States Patent No. 2,180,591, both methods are complicated and add appreciably to the cost of manufacture of the machine, the latter method being subject to the further objection that it increases appreciably the mass of moving parts.

The principal objects of the present invention are to overcome the aforementioned objectionable features and to provide a grading machine which is capable of accurately measuring to any desired degree of precision the thickness of sheet material over a given range of thickness.

More specific objects are to provide a grading machine having an efficient and reliable measurement transmitting mechanism inherently free from cosine errors; to provide a machine capable of edge grading which has reduced friction and inertia; and to provide a machine capable of grading blanks in the various ways above mentioned and in which the transmitting and grading mechanisms are associated with the measuring means, but independently actuated so as to relieve the measuring means of the mechanical work of actuating the transmitting mechanisms or the grading mechanisms and thereby to insure sensitiveness and accuracy in the operation of the measuring means.

Further objects relate to various features of construction and will be apparent from a consideration of the following description and the accompanying drawings, wherein—

Fig. 5 is an enlarged elevation, with certain parts broken away and shown in section, of the detecting means and associated parts;

Fig. 6 is a section on the line 6—6 of Fig. 5;

Figs. 7, 8 and 9 are enlarged sectional details of parts embodied in the detecting means;

Figure 10:
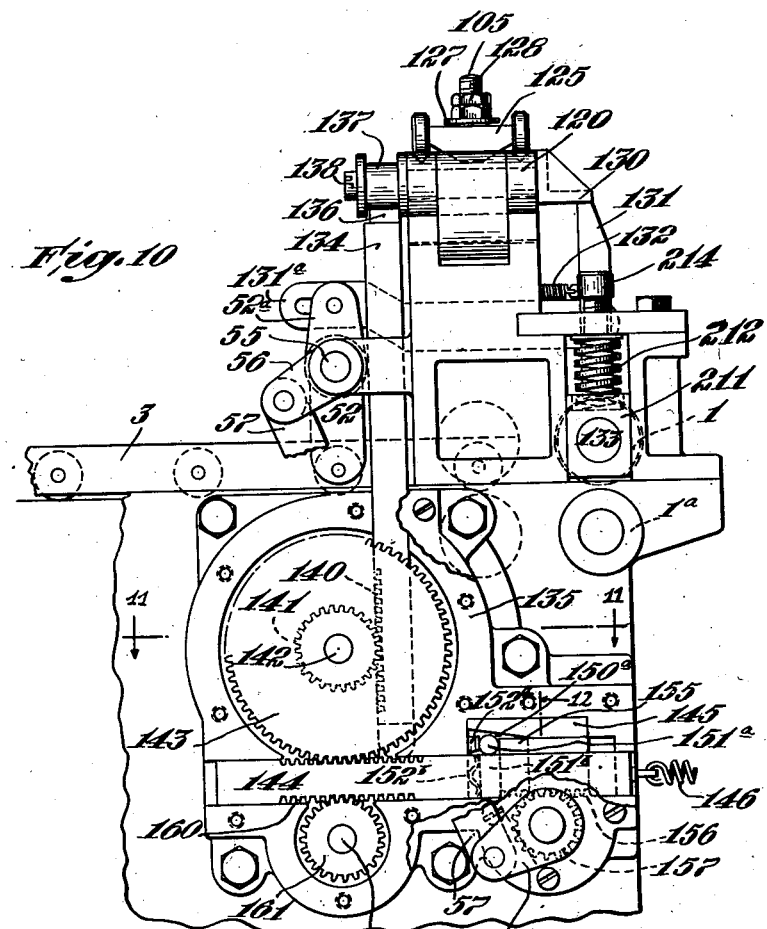
Fig. 10 is an enlarged fragmentary side elevation of the measurement transmitting mechanism.
Figures 11, 12:
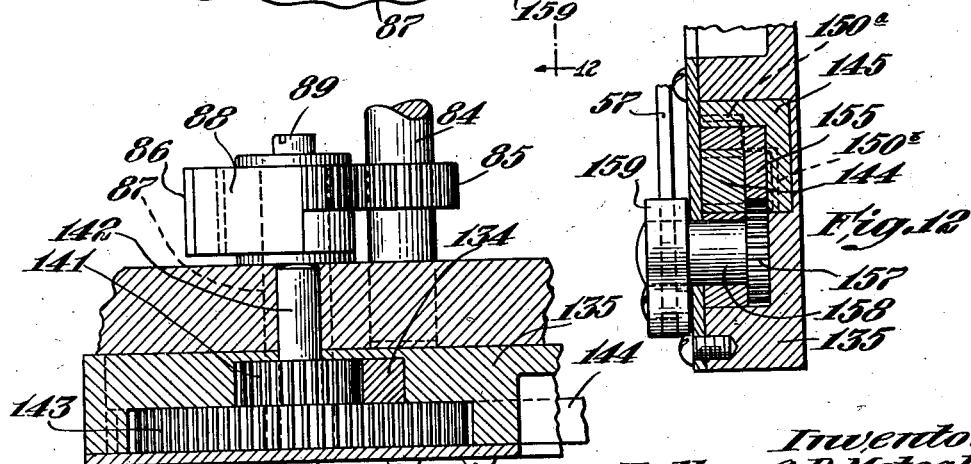
Figure 15:
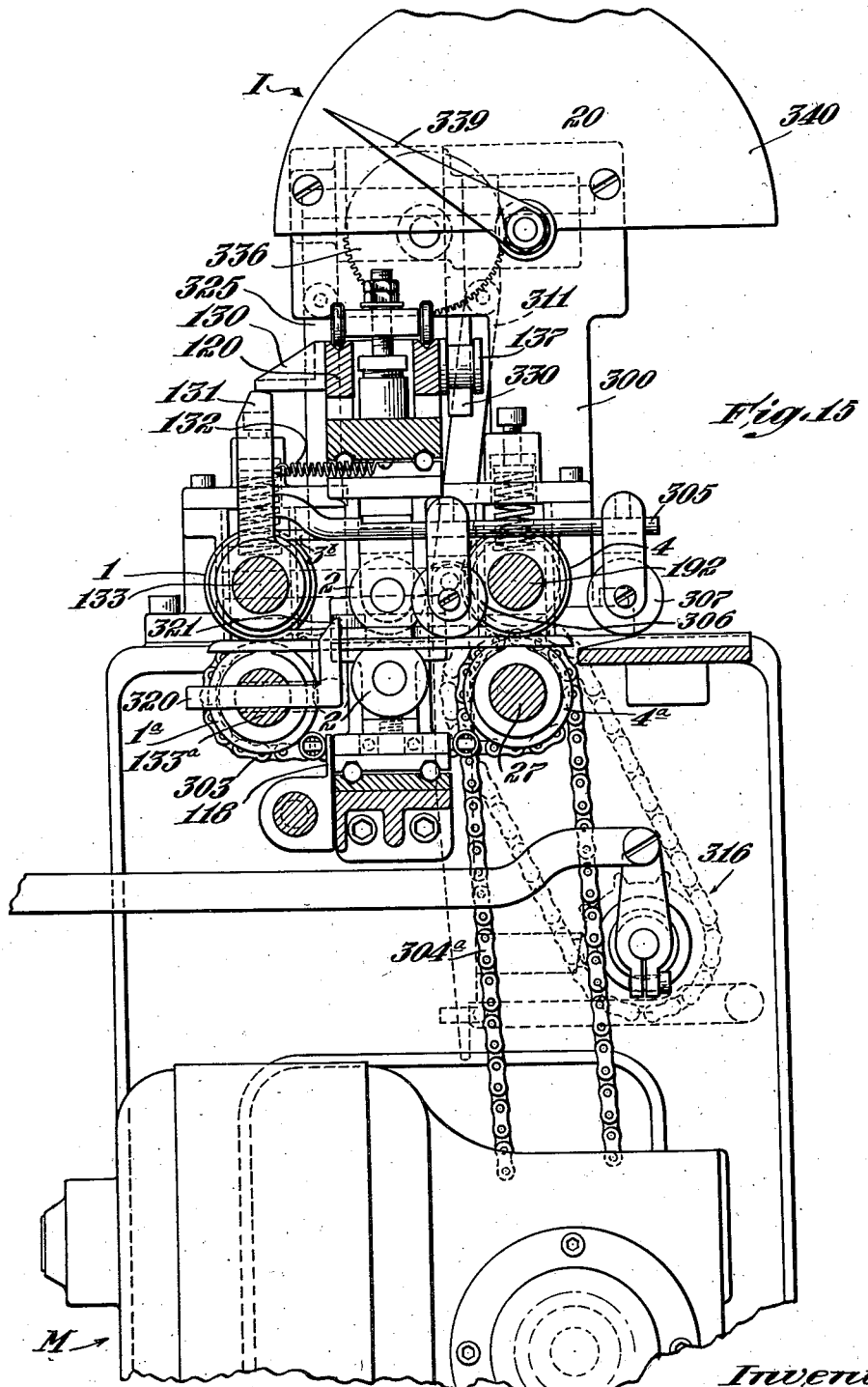
Figure 16:
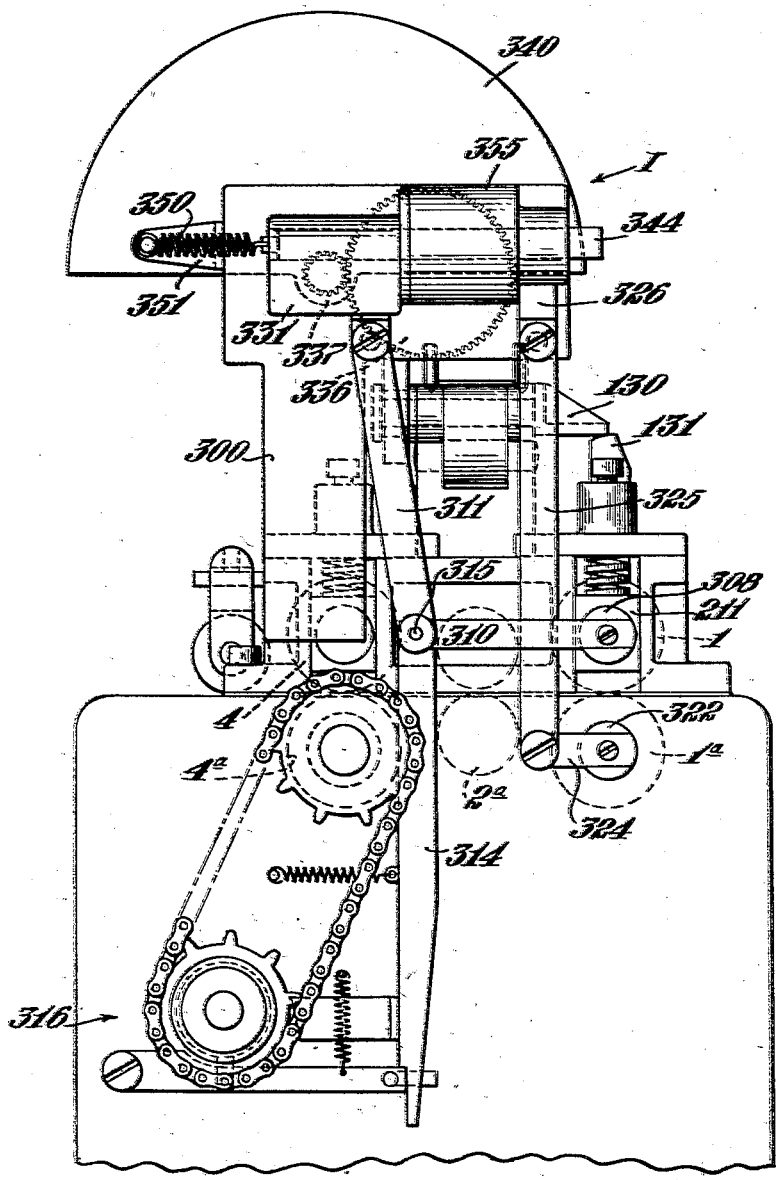

Figs. 11 and 12 are enlarged sections on the lines 11—11 and 12—12, respectively, of Fig. 10;

Fig. 13 is an enlarged fragmentary sectional elevation of one end of the setting mechanism or wedge members associated with the skiving rolls;

Fig. 14 is a sectional detail of one of the wedges;

Fig. 15 is a (front) side elevation, with parts broken away and shown in section, of another grading machine constructed in accordance with the present invention and which includes a visual indicator;

Fig. 16 is a (rear) side elevation of the machine shown in Fig. 15;

Fig. 17 is a rear end elevation of the machine with the upper rear feed roll removed;

Fig. 18 is a top plan view of the visual indicator and associated parts;

Figs. 19 and 20 are enlarged sections on the lines 19—19 and 20—20, respectively, of Fig. 18;

Fig. 21 is a section on the line 21—21 of Fig. 19;

Fig. 22 is a view similar to Fig. 15, but showing an automatic sole feeding and caliper roll separating mechanism; and Fig. 23 is a horizontal section, with parts removed, on the line 23—23 of Fig. 22.

The machine illustrated in Figs. 1 to 14 comprises a magazine or hopper H (Figs. 1 and 2) for holding a stack of blanks to be operated upon. In the present case this hopper is designed to hold a stack of soles or similar blanks and is shown as loaded with a stack of soles S. The soles may be fed forward, toe end or heel end foremost, one at a time from the bottom of hopper H to a pair of continuously driven feed rolls 1 and 1ª (Figs. 1 to 4) which positively deliver the soles to the measuring mechanism.

The particular measuring mechanism C herein shown (Figs. 3 to 5) comprises two detecting and calipering casters, each including an upper calipering roll 2 and a lower calipering roll 2ª which traverse the marginal portions only of the blank and follow the contour of the edge of the blank.

Figure 1:
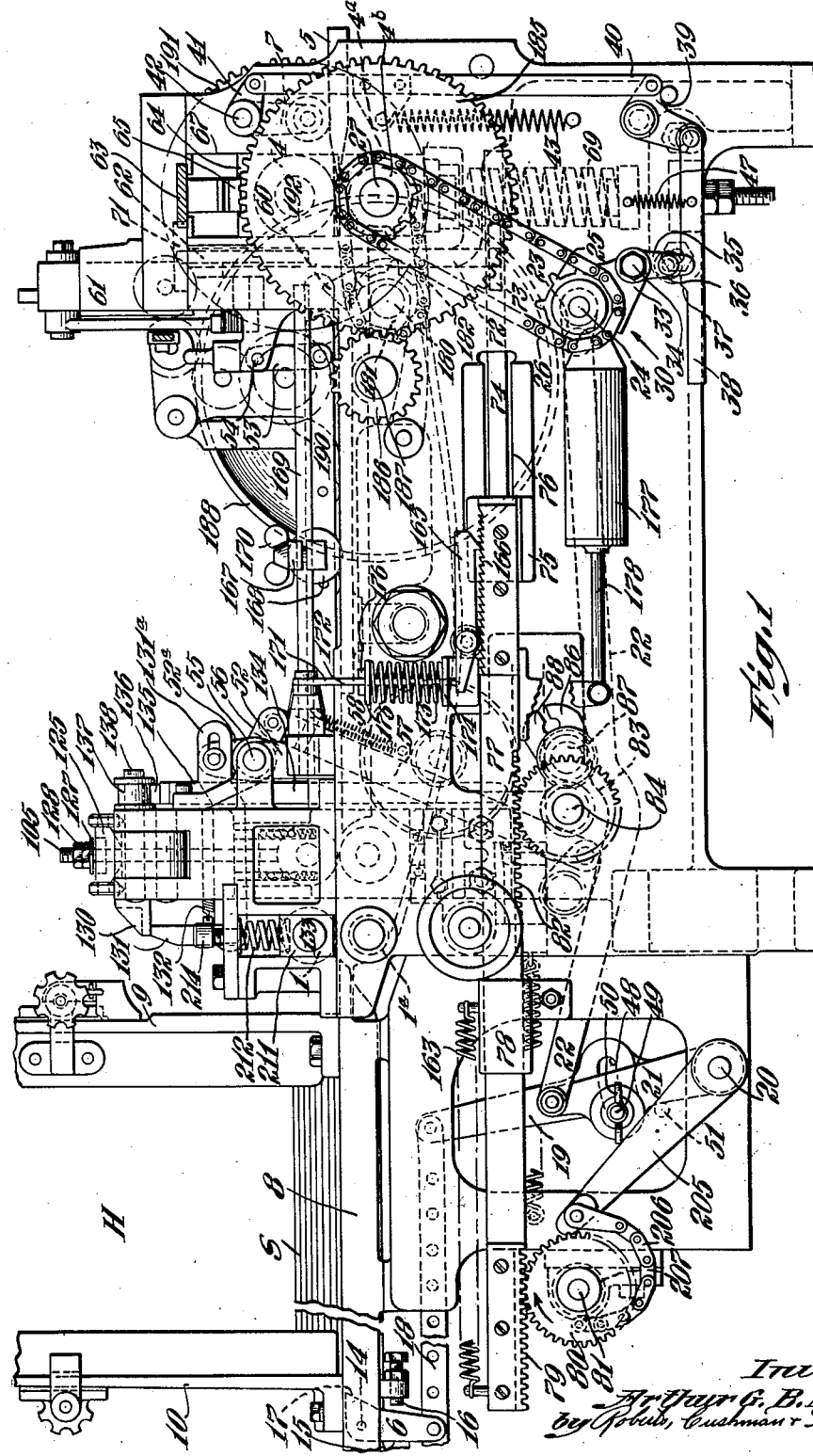
Fig. 1 is a side elevation of one embodiment of a grading machine constructed in accordance with the present invention and which includes a marking and skiving mechanism.
Figure 2:
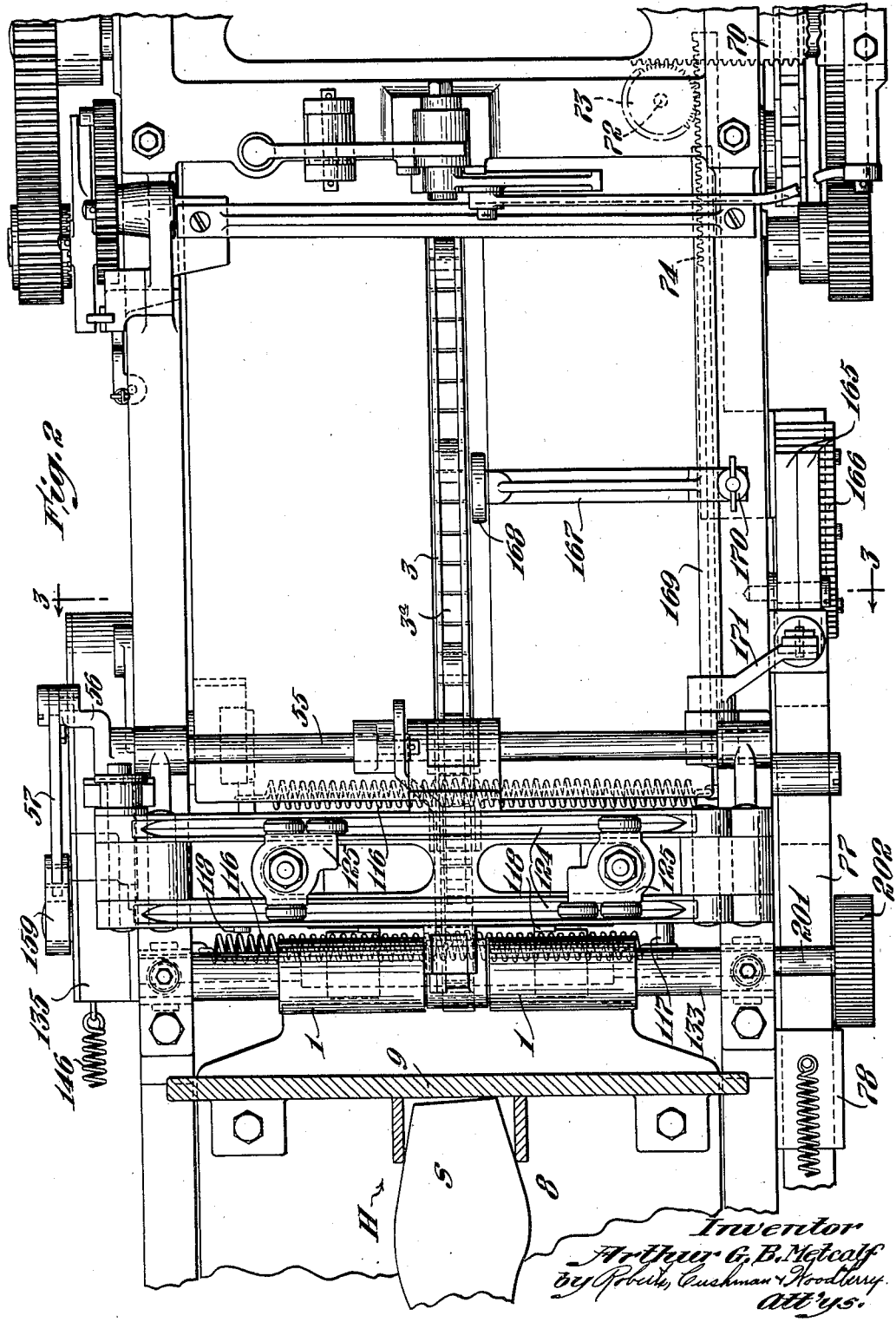
Fig. 2 is an enlarged top plan view showing the detecting means, measurement transmitting mechanism and associated parts.
Figure 3:
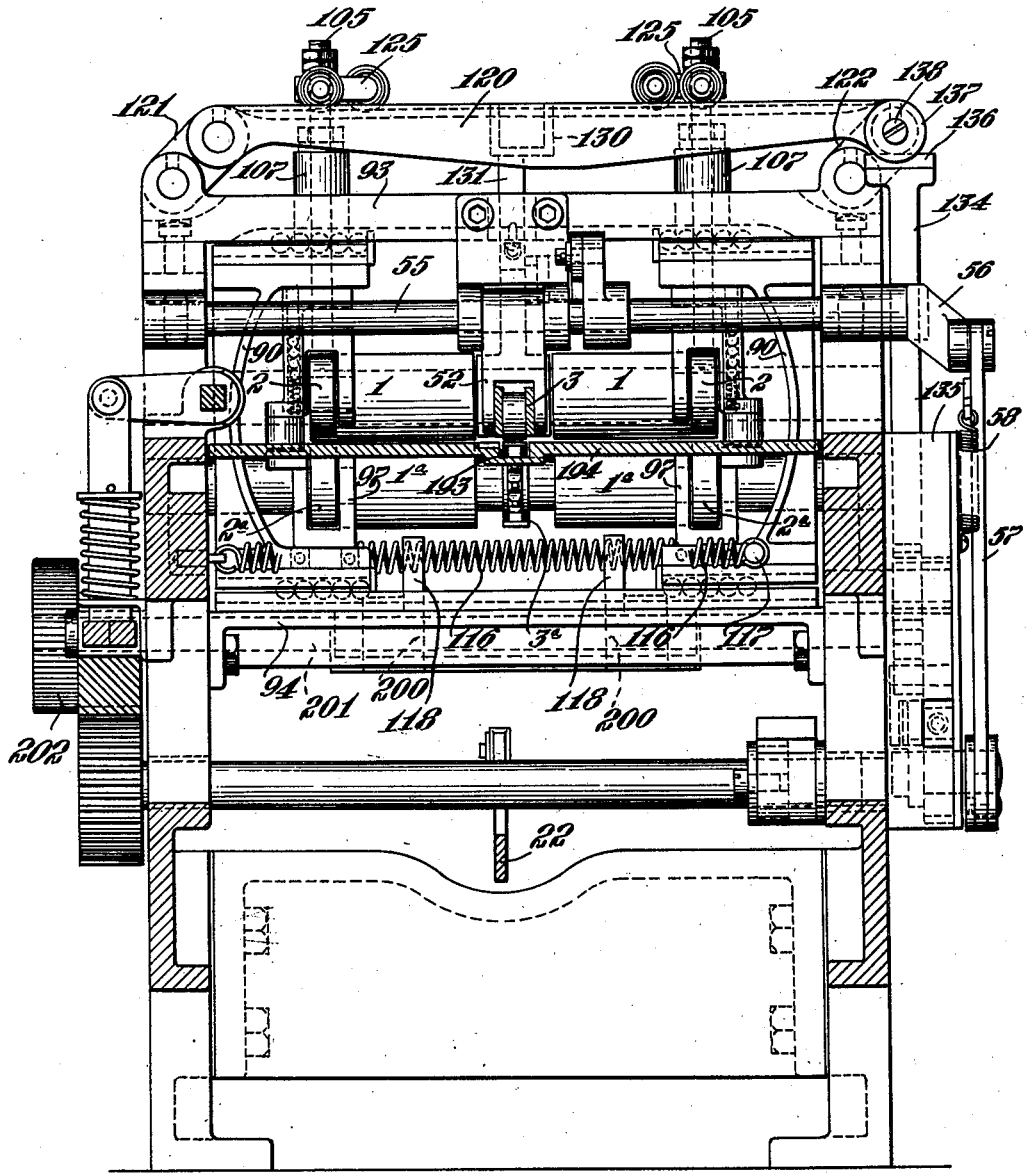
Fig. 3 is a section on the line 3—3 of Fig. 2.
Figure 4:
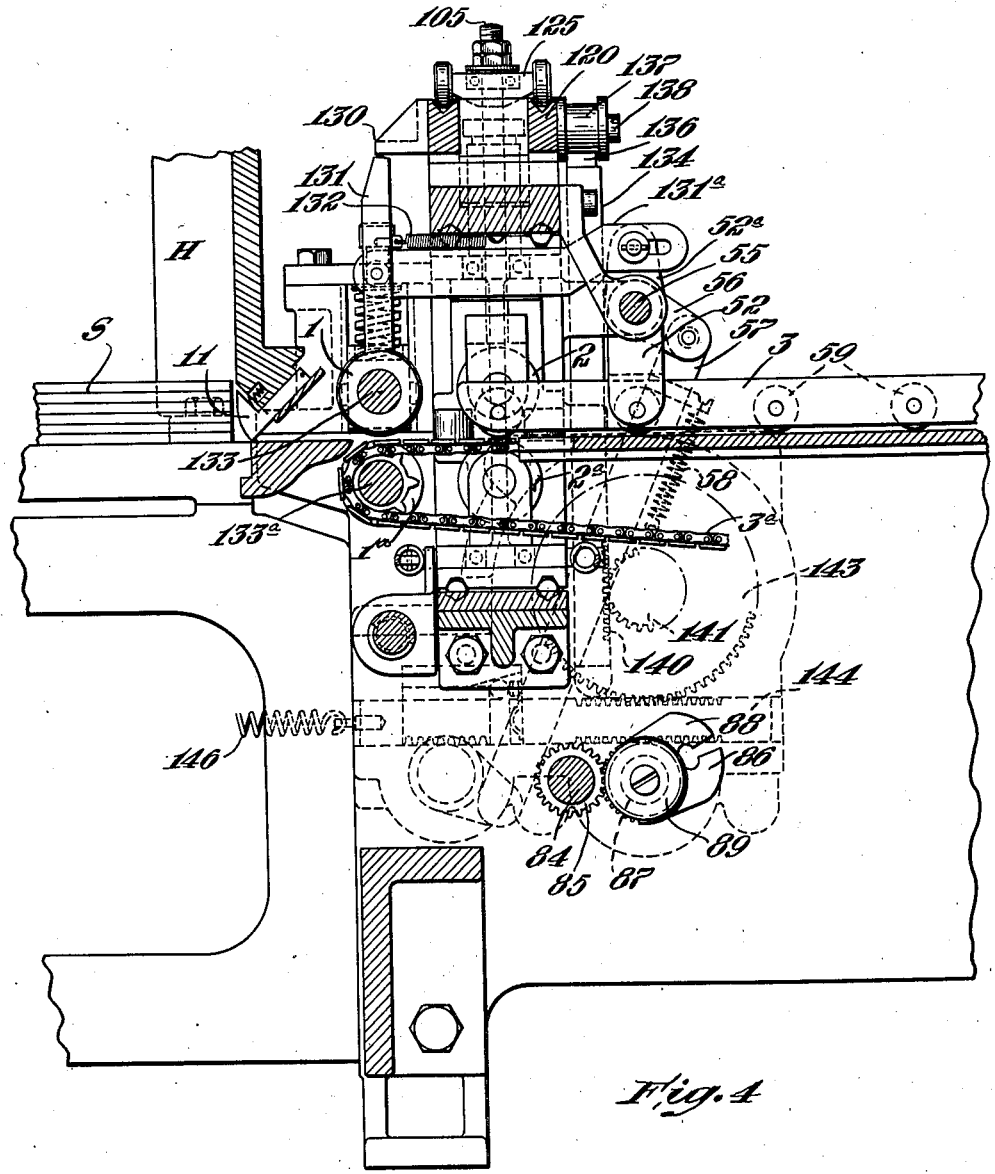
Fig. 4 is an enlarged longitudinal section through the detecting means, measurement transmitting mechanism and associated parts.

As the forward end of each blank emerges from between the calipering rolls 2 and 2ª it enters between a presser bar 3 and a continuously driven conveyor chain 3ª (Figs. 2, 3 and 4). The blank is carried forward between the presser bar 3 and the conveyor chain 3ª to a pair of continuously driven feeding and skiving rolls 4 and 4ª (Figs. 1 and 13), which propel the blank past the cutting edge of a fixed knife blade 5 (Fig. 1), by which the blank is skived or evened to a uniform thickness which corresponds to the thinnest spot of the marginal portions as detected and measured by either pair of calipering rolls 2 and 2ª. The conveyor 3ª may be provided with traction pads of known construction and is driven by a continuously driven sprocket wheel 181 (Fig. 1).

The mechanism for feeding the soles or other blanks forward one by one from the bottom of the stack in hopper H includes a pawl 6 (Fig. 1) which is normally at rest in a retracted position as shown in the drawings. The feed pawl 6 is operated to feed a blank into the machine each time the preceding completed blank is removed from the machine. As the forward end of each blank emerges from between the skiving rolls 4 and 4ª it engages and swings forwardly and upwardly a roller on the end of a trip arm 7 (Fig. 1) which prepares or sets for operation the mechanism by which the feed pawl 6 is actuated. The arm 7 remains supported by the blank until the blank is manually or automatically removed from the machine, whereupon the arm 7 is automatically restored to its original position by a spring, as hereinafter described, and acts through other mechanism, presently to be described, to bring about a single reciprocatory movement of the feed pawl 6 toward and away from the feed rolls 1 and 1ª. Thus, the removal of a completed blank from the machine causes the feed pawl 6 automatically to move forward and to feed the lowermost blank from the hopper H and deliver it to the feed rolls 1 and 1ª, after which the feed pawl returns to its normal, retracted, inoperative position where it remains at rest until the next completed blank is removed from underneath the trip arm 7. In the embodiments herein illustrated it is contemplated that the measured blank is to be removed from under the trip arm 7 by hand. In some known grading machines of this type a pair of ejecting rolls are provided for seizing the blank after it emerges from between the skiving rolls 4 and 4ª and ejecting it from the machine. Such ejecting rolls (not herein shown) may be used, if desired, in which case the fall of arm 7 and the consequent operation of the feed pawl 6 will be effected automatically instead of manually.

The hopper H (Figs. 1 and 2) comprises a bottom or floor 8 whose top surface is smooth and flat, a fixed front wall 9 of usual construction and a movable rear wall 10 of usual construction adjustable toward and away from the fixed front wall, according to the size of the blanks, and provided with means for fixing it in adjusted position. At the bottom of the fixed front wall 9 there is the usual spring-pressed detent 11 (Fig. 4) which prevents more than one blank at a time from being fed forwardly into the machine, and the floor 8 of the hopper is formed with a longitudinal slot within which slides a carriage upon which the feed pawl 6 is pivoted at 14, as more fully shown and described in United States Patent No. 2,187,204. The feed pawl 6 is free to swing in one direction on its pivot 14 to a limited extent determined by a stop lug 15, and in the opposite direction to a limited extent determined by an adjustable stop screw 16 (Fig. 1) carried by the carriage. When the pawl 6 is against stop lug 15 the blank-engaging nose 17 of the pawl is held below the plane of the top surface of the floor 8, but when the pawl 6 is swung against top screw 16 its nose 17 is raised above the level of the floor 8 and is in position to engage the lowermost blank in the hopper H.

The lower end of the pawl 6 is connected by a link 18 with an arm 19 which is loosely mounted on a rock shaft 20 (Fig. 1). Fixed to rock shaft 20 alongside the arm 19 is another arm 21 which is frictionally and yieldingly connected with arm 19. The free end of arm 21 is connected by a rearwardly extending link 22 with a crank arm 23 fast on shaft 24 which is normally at rest. Loosely mounted on the end of shaft 24 outside of the frame of the machine is a sprocket wheel 25 (Fig. 1) connected by a chain 26 with a sprocket wheel 4ᵇ fast on the continuously rotating shaft 27 of the lower skiving roll 4ᵃ which drives the conveyor chain 3ᵃ.

The continuously rotated sprocket wheel 25 carries a clutch mechanism 30 (Fig. 1), comprising a fixed clutch member which is operatively associated with a complementary clutch member splined on shaft 24 so as to be movable axially of the shaft into and out of engagement with the fixed clutch member. The construction of the clutch mechanism is fully shown in United States Patent No. 2,187,204, to which reference may be had for a detailed description. The clutch members are normally disengaged and are operatively associated with the shipper 33 (Fig. 1) which is pivotally mounted at 34 on the frame of the machine. The shipper member 33 has a depending arm 35 carrying a roller 36 at its lower end to cooperate with an inclined shoulder 37 provided upon a push bar 38.

The push bar 38 is connected by a bell-crank lever 39, pivoted to the machine frame, with the lower end of a link 40 whose upper end is pivoted to an arm 41 fast on a transverse rock shaft 42, to which the trip arm 7 is fastened. A spring 43 (Fig. 1) connected at one end with link 40 and at the other end with the frame of the machine yieldingly urges the trip arm 7 downwardly toward its lowermost position and yieldingly urges the push bar 38 endwise toward the left, as shown in Fig. 1.

When a finished blank emerging from between rolls 4 and 4ᵃ engages and swings the trip arm 7 to the right (Fig. 1) it acts through rock shaft 42, arm 41, link 40 and bell crank 39 to move the push bar 38 toward the right (Fig. 1), thereby shifting the shoulder 37 to the right of roll 36. At the same time a spring 47 causes the push bar 38 to swing upwardly and holds the push bar 38 in contact with roll 36. This brings the shoulder 37 directly behind the shipper roll 36 in a position to engage the roll 36 when the push bar is later shifted toward the left by spring 43.

When the finished blank is removed from under the trip arm 7 the spring 43 forces the push bar 38 toward the left thereby acting through shoulder 37 to operate the shipper member 33, in the manner more fully explained in United States Patent No. 2,187,204, whereupon a spring (constituting part of the clutch mechanism 30) shifts the movable clutch member axially on shaft 24 into engagement with the rotating clutch member, thus rotating the shaft 24 and crank arm 23 in a clockwise direction. The shipper member 33 is provided with means operative to restore it to normal position after completing one revolution, which is fully described in United States Patent No. 2,187,204. As the shipper member 33 is swung back to its normal position the roller 36 is positively forced past the shoulder 37 on push bar 38 into the position shown in Fig. 1, the spring 47 permitting the bar 38 to yield downwardly during this return movement of the shipper member.

As shown in Fig. 1, the arm 19 (on shaft 20) through which the feed pawl 6 is reciprocated is made with an arcuate slot 48 concentric with the axis of the shaft 20. This slot is engaged by a bolt 49 carried by the arm 21. The bolt 49 is provided with a head at one end and a wing nut 50 at its opposite end, which may be set up sufficiently tight to provide a frictional power transmitting connection between the two arms, positive enough to actuate the feed pawl 6 under normal conditions but nevertheless capable of yielding or slipping to permit the arm 21 to move independently of the arm 19 in the event that a blank should become clogged in the hopper. Upon the return movement of the arm 21 toward the left this frictional connection will cause the arm 19 to move with it until the arm 19 engages a stop 51 projecting from the frame of the machine, after which the yielding frictional connection will permit the arm 21 to complete its movement toward the left independently of the arm 19 until the arm 21 reaches the limit of its stroke. In this manner the two arms 19 and 21 are automatically restored to their normal relationship and the feed slide is also restored to its normally retracted position at the conclusion of the feeding and return stroke of the arm 21 during which the proper action of the feed slide and feed pawl 6 has been prevented through clogging or has been otherwise obstructed.

The presser bar 3 is disposed longitudinally of the machine directly above and parallel to the path of the soles and the conveyor 3ᵃ, and is carried by a pair of parallel arms 52 and 53 (Figs. 1, 3 and 4) of equal length, whose lower ends are pivotally connected with said bar. The arm 53 (Fig. 1) is pivotally mounted at 54 upon a crossbar of the machine frame and the arm 52 is fast upon a transverse rock shaft 55 (Fig. 4) journaled in bearings on another crossbar of the machine frame. The arm 52 is provided with an extension 52ᵃ adapted to rock toward the left (Figs. 1 and 4), the utility of which is hereinafter pointed out. The presser bar 3 thus swings in parallelism with the conveyor 3ᵃ. At one end of shaft 55 outside of the machine frame is fixed an arm 56 which is connected to a downwardly extending link 57 (Figs. 1, 2 and 4). A spring 58 (Figs. 1 and 3) yieldingly urges the link 57 downwardly and acts through arm 56, rock shaft 55 and arm 52 yieldingly to hold the presser bar 3 downwardly and to the left, movement of the presser bar in that direction being limited by the engagement of a suitable stop (not shown) on arm 52 with a crossbar of the machine frame (Fig. 4). The presser bar 3 may be equipped with a plurality of anti-friction rollers 59 which travel on the top side of the blanks as they are fed through the machine by the conveyor chain 3ᵃ. Thus, as the soles pass through the machine they are held by the spring-pressed bar 3 firmly in engagement with the travelling conveyor 3ᵃ by which they are carried forwardly to the skiving rolls 4 and 4ᵃ.

As the forward end of the blank approaches the skiving rolls 4 and 4ᵃ it engages and depresses a trip 60 (Fig. 1) which acts through usual mechanism to effect a single vertical reciprocation of a slide 61. The slide 61 carries a marking or stamping wheel 62 of known construction whose periphery is made with marking characters or types indicating grades, usually in terms of irons and half irons. The type wheel 62 is rotatably adjusted as usual by the endwise movement of a transverse slide bar 63 (Figs. 1, 2 and 4), mounted in ways on the frame of the machine, and when the type wheel is forced down on top of the blank by the reciprocation of slide 61 the appropriate grade mark is impressed upon the blank. During the operation of the machine the slide bar 63 is adjusted endwise and set in response to and in accordance with the thickness of the thinnest part of the blank as determined by the detecting and measuring mechanism.

The upper skiving roll 4 (Figs. 1 and 13) is journaled in bearing boxes 64 which are mounted to move in vertical ways 67 on the frame of the machine. Each bearing box 64 is provided upon its top side, as usual, with a wedge block or inclined abutment 65 (Figs. 1 and 13) to cooperate with a similar inverted wedge block or inclined abutment 66 adjustably secured to the under side of slide bar 63, as shown in Fig. 14. Although the opposed faces of the wedge blocks may be stepped, as usual, to provide horizontal stop surfaces, they are here shown as being formed with transversely extending V-shaped steps or serrations which are effective to insure an extremely accurate setting of the roll 4, relative to the roll 4ª, since any error in the original setting of the movable wedge is corrected by the action of the V-shaped steps which engage in a definite and predetermined measurement position. The lower skiving roll 4ª is journaled in bearing boxes 68 (Fig. 13) which are also mounted to slide in the vertical ways 67 and are yieldingly supported as usual by a pair of stiff springs, one of which is shown at 69 in Fig. 1.

When the forward end of a blank enters between the skiving rolls 4 and 4ª, the slide bar 63 having previously been adjusted by the detecting and measuring mechanism in accordance with the thickness grade of that blank, the upper roll 4 is lifted until its pair of wedge blocks or abutments 65 engage and are stopped by the pair of abutments 66 on slide bar 63. The distance between roll 4 and the edge of the knife blade 5 now corresponds to the thickness of the thinnest spot of the blank as determined by the measuring mechanism and determines the thickness to which the blank will be evened or skived. Thicker areas of the blank will force the lower roll 4ª downwardly against the pressure of springs 69 and will be skived off by the knife 5.

The transverse slide bar 63 is made with a rack of teeth 70 (Fig. 13) meshing with a pinion 71 fixed to the upper end of a vertical shaft 72 journaled in bearings on the machine frame. At the lower end of shaft 72 is fixed a pinion 73 meshing with a rack bar 74 (Figs. 1 and 2). The rack bar 74 is attached at one end to a slide 75 (Fig. 1) mounted in ways 76 on the machine frame and the slide 75 is in turn attached to one end of another rack bar 77 which is mounted to slide on ways in bracket 78 on the machine frame. The opposite end of rack bar 77 is provided with a rack of teeth 79 meshing with a gear 80 fast on a transverse shaft 81 journaled in bearings on the frame of the machine.

The rack bar 77 is provided with teeth 82 (Fig. 1) meshing with a gear 83 fast on shaft 84 which is journaled in suitable bearings on the machine frame. A gear 85 (Figs. 4 and 11), fast on shaft 84, meshes with a segmental gear having an abutment arm 86, the segmental gear being freely rotatable on a shaft 87 journaled in suitable bearings on the machine frame. The abutment arm 86 is engageable with a complementary abutment or stop arm 88 fast on shaft 87, the parts being maintained in operative relation by a retainer member 89 (Fig. 11) secured to the end of shaft 87. It will be observed that when the rack bar 77 moves to the right (Fig. 1), it acts through the rack 82 and gear 83 to rotate the shaft 84 in a clockwise direction and also through gear 85 to swing the abutment arm 86 into engagement with the stop arm 88. The engagement of the abutment arms 86 and 88 thus limits the rearward movement (toward the right—Fig. 1) of the rack bar 77 and consequently controls the setting of the wedges 66. Hence, by adjusting the position of the stop arm 88 in accordance with the measured thickness of a sole blank S, the grading or skiving mechanism may be set to respond to the operation of the calipering rolls and measurement transmitting mechanism presently to be described.

Referring to Figs. 3 and 5 to 9, inclusive, the calipering mechanism C comprises a pair of upright yokes or frames 90 each having inwardly extending upper and lower arms 91 and 92. The yokes 90 are mounted between the upper and lower transverse frame members 93 and 94 so as to move toward and away from each other transversely of the path of travel of the sole blank with a minimum amount of friction. To this end the under surface of the member 93 and the upper face of the member 94 are formed with a pair of accurately machined grooves 95, here shown as being of semi-hexagonal cross section to cooperate with similarly formed grooves 96 in the upper face of the arm 91 and the under face of the arm 92, as shown in Fig. 6 and 7. The grooves receive a plurality of ball bearings 96ª which contact the grooves 95 at a point approximately equal to twice the vertical distance of the point of contact with the grooves 96, as indicated at $x$ and $y$ in Fig. 7. This construction and arrangement is not only effective to maintain the yokes in properly centered position, but also such that the travel of the balls 96ª is less than that of the yokes, thereby permitting the use of relatively short ball guides on the yoke, resulting in greatly improved design from the standpoint of minimizing yoke mass and displacement of bearing pressure. It further permits of a much narrower machine.

The lower arm 92 is provided with a ball bearing which supports a pair of upstanding ears 97 between which the lower calipering roll 2ª is rotatably mounted, the upper end of one ear 97 being formed with an ear 98 which cooperates with a similar ear 99 formed on an L-shaped frame member 100. The ends of the ears are formed with openings to receive spindles which rotatably support rollers 101 arranged to engage the peripheral edge of the sole blank being calipered. The vertical wing of the member 100 is channeled so as to receive a depending yoke 102 in which the upper calipering roll 2 is rotatably mounted. In order to provide an anti-friction sliding fit between the channel member 100 and yoke 102 the adjacent edges are grooved to receive a plurality of ball bearing members 103 which are held in position by compression springs 104, as shown in Figs. 5 and 6 to 9, inclusive.

The upper end of each of the yokes 102 is secured to a spindle 105 which projects upwardly through an opening in the horizontal wing of the frame 100, the inner race of radial thrust ball bearing 106 in which the spindle has a snug sliding fit, and through and beyond a sleeve 107 which projects vertically into the slot 108 formed in the upper transverse member 93. A collar 109 (Fig. 5) is fast on the spindle 105 and the lower end of a compression spring 110, surrounding the spindle, acts on the collar yieldingly to hold the calipering roll 2 in its lowermost position, the upper end of the spring 110 acting against a collar 111 having a threaded engagement with the interior of the sleeve 107.

It will be observed that with this construction and arrangement the frames 90 and parts carried thereby are freely movable toward and away from each other and that the yokes 97, 102 and associated parts are freely rotatable about the same axis, irrespective of the position of the frames 90 relative to the frame member 94. In order to limit the rotation of the yokes 97, 102 and normally maintain them in position to receive a blank to be measured, the horizontal wing of each frame member 100 is provided with a laterally projecting arm or pin 112 which is normally held in engagement with a stop pin 114 (Fig. 6) on the adjacent yoke 99 by means of a small tension spring 115 (Fig. 5) which connects the frames 90 and 100.

The caster frames 90 are normally urged inwardly toward each other so as to cause the calipering rolls to engage the narrowest width of the blank by tension springs 116, one end of which is connected to a pin 117 secured to the caster frame and the other end to the frame on the opposite side of the machine, as shown in Figs. 2 and 3. For the purpose of illustration, the frames 99 are here shown in extended position, but it is to be understood that normally they are held relatively close together by the springs 116, and inward movement is limited by the engagement of the pins 117 with stops 118 (Fig. 3) which are adjustably mounted in a manner hereinafter described.

The upper ends of the spindles 105 are operatively connected with the measurement transmission mechanism which comprises a horizontally disposed link or like member 120 supported so as to respond only to downward movement of either spindle 105, thereby to assume an ultimate position corresponding to the minimum thickness of the blank detected by the calipering rolls. Although such a member may be supported in any suitable manner to attain the aforementioned ends, in the embodiments herein shown the link 120 constitutes, in effect, one member of a four-bar or parallel linkage system, the transverse frame member 93 constituting a stationary link, and links 121 and 122 (Fig. 3) constituting the other two members of the system. Accordingly, the link 120 is at all times maintained in parallel relation to the frame member 93 and also the plane of travel of the blank, irrespective of the extent of its upward and downward movement.

The link 120 is slotted to receive the upper ends of the spindles 105 and associated parts, as shown in Figs. 2, 4 and 6, and its upper face is formed with grooves 124 defining a pair of parallel tracks which support a pair of three-wheel carriages or trucks 125. Each carriage is formed with an opening which receives a ball bearing 126 through which the threaded end of one of the spindles 105 projects. By means of a washer 127 the lock nuts 128 the position of the spindles and hence that of the calipering rolls 2 may be adjusted as desired. With this construction and arrangement the calipering rolls 2 and spindles 105 are freely movable vertically in response to variations in thickness of a blank sole passing between the rolls 2 and 2ᵃ, and as the spindles 105 have a free sliding fit in the bearings 126, upward movement thereof is not transmitted to the link 120, but downward movement of either spindle, under the influence of spring 110, is transmitted through the associated carriage 125 to the link 120 which is forced to swing downwardly toward the right (Figs. 3 and 5) to such an extent that the vertical component of its movement is precisely the same as the downward vertical movement of the calipering rolls 2.

Since the link 120 cannot be elevated or held in elevated position by the calipering rolls, an outwardly extending bracket 130 is secured thereto and is engageable by a lever arm 131 which, under the influence of a spring 132 (Fig. 4), is normally held in a position to support the link 120 in elevated position. The feed rolls 1 are, as previously indicated, mounted on a continuously driven shaft 133 which is free to move up and down as the sole enters and leaves the rolls 1 and 1ᵃ, and the lower end of the lever arm 131 is loosely mounted on this shaft so that it may pivot thereon. When a sole enters between the feed rolls 1 and 1ᵃ, the shaft 133 is raised an amount equal to the thickness of the forepart of the sole and consequently the link 120 is elevated by the lever arm 131 to its uppermost position for measuring the sole blank. In order to release the link 120 so that it will be free to respond to the calipering rolls, the lever arm 131 is pivotally connected to a link 131ᵃ (Figs. 1, 4 and 10) which has a pin and slot connection with the upper end of the extension arm 52ᵃ fast on the rock shaft 55. The pin and slot connection not only serves to limit the inward movement of the lever arm 131 and link 131ᵃ under the influence of spring 132, but also causes these parts to move toward the left (Figs. 1 and 4) when the rock shaft 55 is rotated in a counterclockwise direction. Hence, when a sole blank enters beneath the forward end of the presser bar 3, swinging the same rearwardly and effecting a counterclockwise rotation of rock shaft 55, lever arm 131 is pushed outwardly from beneath the bracket 130, thus releasing the link 120; and when the presser bar is restored to its lowermost position, the rock shaft 55 and extension 52ᵃ are rotated in a clockwise direction, thus permitting the spring 132 to restore the lever arm 131 to a normal position beneath the bracket 130, it being noted that when the sole passes from beneath the feed rolls the arm 131 drops to a level below that of the bracket 130.

The vertical downward movement of the link 120 is transmitted to the grading mechanism through a vertically disposed push bar 134 mounted in suitable guideways in the frame or casing 135 (Figs. 10 and 11). The upper end of the bar 134 is formed with a flat head 136 engageable with a roller 137 mounted on stud shaft 138 which is rigidly secured to the link 120. The lower end of the bar 134 is formed with rack teeth 140 (Figs. 10 and 11) which mesh with pinion 141 rotatable on shaft 142. The pinion 141 is pinned or otherwise secured to gear 143 which meshes with teeth on the upper edge of rack bar 144 slidably mounted in suitable guideways formed in frame 135. A tension spring 146 (Figs. 4 and 10) urges the bar 144 toward the right (Figs. 10 and 11) and acts through the gear train yieldingly to hold the head 136 of bar 134 against the roller 137, thus effectively eliminating play or lost motion within the transmission mechanism.

It will be noted that movement of the bar 144 to the left (Fig. 10) is in direct proportion to the maximum movement of the calipering rolls and hence corresponds to the measurement of the thinnest part of the measured sole blank as detected by the calipering rolls 2. Since it is desired to preserve only the thinnest measurement which corresponds to the maximum movement of the bar 144 to the left (Fig. 10), means are provided to lock the bar 144 against movement toward the right in response to thicker areas of the sole during the period required to measure and grade the sole passing through the machine. To accomplish this function the frame 135 is formed with a chamber through which the right-hand end of bar 144 projects and an angular-shaped member 145 is mounted within this chamber, as shown more clearly in Fig. 12. The inner ends of each wing of the member 145 are tapered as indicated at 150$^a$ and 150$^b$ and roller bearings 151$^a$ and 151$^b$ are interposed between the inclined or tapered surfaces 150$^a$, 150$^b$ and the adjacent faces of the bar 144. Small leaf springs 152$^a$ and 152$^b$ are provided so as normally to hold the rollers 151$^a$, 151$^b$ against the inclined surfaces 150$^a$, 150$^b$, respectively, and are thus effective to lock the bar 144 against movement toward the right (Fig. 10), due to the wedging action of the inclined surfaces. The bar 144 is therefore free to move toward the left in response to downward movement of the calipering rolls 2, but is locked against movement toward the right so long as the rollers are in contact with the inclined surfaces and the upper and inner faces of the bar 144.

In order to release the bar 144 it is merely necessary to disengage the rollers from the inclined surfaces, and to this end there is provided a release bar 155 (Figs. 10 and 12), the lower edge of which is formed with rack teeth 156 meshing with pinion 157 which is fast to the inner end of stud shaft 158. The outer end of shaft 158 carries an arm 159 which is pivotally connected to the link 57. As previously explained, the link 57 is normally held downwardly by spring 58 (Figs. 1 and 3) and is thus operative to maintain the locking mechanism ineffective so long as the presser bar 3 is in its lowermost position, it being noted that when in this position the release bar 155 is held in engagement with the rollers 151$^a$ and 151$^b$ so that they are spaced from the adjacent inclined surfaces 150$^a$, 150$^b$, thus permitting the rack bar 144 to be moved by spring 146 to the right to a position determined by the position of linkage 120, as shown in Fig. 10. Accordingly, the rack bar 144, acting through the gear train and associated parts 140 to 143, is normally operative to urge the slide bar 134 upwardly so as to maintain it in contact with roll 137, thus avoiding lost motion between the parts. When the presser bar 3 is raised by a sole passing through the machine, the rock shaft 55 is rotated, the arm 56 swung clockwise (Fig. 10), the link 57 raised, and the arm 159 swung upwardly to withdraw the release bar 155 from engagement with the rollers 151$^a$, 151$^b$, whereupon the springs 152$^a$, 152$^b$ act to move the rollers into engagement with the inclined surfaces 150$^a$, 150$^b$, thus locking the bar 144 against movement toward the right (Fig. 10), which of course preserves the minimum measurement detected by the calipering rolls 2, 2$^a$. So long as the presser bar 3 is maintained in elevated position, the bar 144 remains locked, but when presser bar 3 drops, the sole has already entered between the skiving rollers and the skiving wedges are locked. The whole system is then locked against movement while this condition prevails.

The lower edge of the rack bar 144 is formed with teeth 160 (Fig. 10) which mesh with a gear 161 fast on the shaft 87. Since, as previously explained, movement of the bar 144 toward the left (Fig. 10) indicates thinness measurements, such movement is transmitted through gear 161 to the shaft 87 which supports the stop or abutment arm 88 (Fig. 4). Accordingly, the position of arm 88 corresponds precisely to the minimum thickness detected by the calipering rolls and transmitted to the link 120 and associated parts, and as the arm 88 is effective to limit the rearward movement of rack bar 77, it therefore controls the grading mechanism so that the latter responds to the measured thickness of the sole blank.

The rack bar 77 has connected to it one end of a comparatively heavy and dominant spring 163 (Fig. 1), the opposite end of which is connected with the frame of the machine. The spring 163 is normally under tension and tends to shift the rack bar 77 toward the right as indicated by the arrow in Fig. 1. The rack bar 77, however, is normally prevented from moving to the right by one or the other of a pair of detents 165 which engage a row of ratchet teeth 166 fixed to the bar 77 (Figs. 1 and 2). The rack bar 77 constitutes the power transmission member by which the grading devices are adjusted. The pawls 165 are controlled by a trip in the path of the blanks passing through the machine. This trip and the mechanism for controlling the pawls 165 include a trip arm 167 (Figs. 1 and 2) provided at its free end with a roller 168 which normally lies in the path of the blanks and is engaged and lifted by each blank passing underneath it. The other end of the trip arm 167 is made with a split hub which is clamped on a rock shaft 169 with provision for adjustment lengthwise of the rock shaft by means of a thumbscrew 170. The shaft 169 is square in cross section for the greater part of its length but is made with cylindrical end portions journaled in bearings on the frame of the machine.

One end of the shaft 169 carries an arm 171 to which is pivotally connected a depending push rod 172 (Fig. 1). The lower end of the push rod 172 engages the tailpieces of pawls 165. A spring 173 circumposed about the lower part of push rod 172 bears at one end against a bracket 174 on the machine frame and at the other end against a washer 175 held in position on the push rod by a pin 176. The spring 173 yieldingly holds the push rod to the limit of its upward movement with the trip arm 167 and trip roll 168 in depressed position in the path of the blanks. When the forward end of a blank comes underneath trip roll 168 it acts through arm 167, rock shaft 169, arm 171 and push rod 172 to disengage both detents or pawls 165 from the ratchet teeth 166, whereupon the spring 163 shifts the rack bar 77 toward the right (Fig. 1). This movement of rack bar 77 also shifts the slide 75 and rack bar 74 to the right and the movement of rack bar 74 rotates pinion 73, shaft 72 and pinion 71 in a direction to shift the transverse slide bar 63 endwise, that is, away from the observer in Fig. 1. This movement, under the influence of the heavy spring 163, is retarded or cushioned to avoid undue shocks by a dashpot 177 whose piston rod 178 is connected with an arm 179 projecting from the rack bar 77.

When the rack bar 77 is thus released from the locking pawls 165 and shifted to the right (Fig. 1), it also acts through rack 79 and gear 80 to rotate the shaft 81 in the direction of the arrow and also the gears 83 and 85 until the abutment arm 86 fixed to shaft 87 is brought into engagement with its complementary stop arm 88, which has previously been adjusted and set by the action of the marginal calipering devices and associated transmission mechanism. This engagement of the arms 86 with the arms 88 limits the extent of movement of the rack bar 77 under the influence of spring 163, the stop arm 88 being rigidly locked against reverse movement by the action of the locking mechanism 150—155.

During the measuring of the blank by the calipering rolls the two spindles 105 will be moved up and down in response to differences in thickness of different parts of the blank but owing to the fact that only downward movement is transmitted to the link 120 and associated parts, the stop arm 88 can only be adjusted in response to successively thinner spots encountered by the calipering rolls.

Trip 168 on trip arm 167 (Fig. 1) is so positioned as to be engaged by the forward end of the blank before the rear end of the blank leaves the calipering rolls. Hence the spring 163 comes into operation before the upper calipering rolls are released by the blank. Also by the adjustment of trip arm 167 lengthwise on rock shaft 169 the length of the part of the blank which is to be calipered may be varied.

It will now be clear that the calipering rolls, which traverse the opposite side margins of the blank and by which the thinnest spot is detected, will control and determine the extent of movement toward the right (Fig. 1) of rack bar 77, and that the extent of movement of the rack bar 77 and of slide bar 63 occasioned by the operation of trip 167 will be directly proportional to the thickness of the thinnest spot of the marginal area as determined by either of the two calipering devices. This movement of the rack bar 77 and slide 63 may be several times the corresponding movement of the calipering rolls 2 in response to variations in the actual thickness dimensions of the blank, depending upon the gear ratios of the measurement transmitting mechanism.

The sprocket wheel (at the rear of the machine) by which the conveyor chain 3a is driven is fast on a transverse shaft 180 (Fig. 1), on which is also fixed a second sprocket wheel 181 connected by a chain 182 with a sprocket wheel fast on shaft 27 of the lower feeding and skiving roll 4a. Shaft 27 also has fixed to it a gear wheel 185 (Fig. 1) which is driven by another gear 186 fast on the continuously driven shaft 187. Shaft 187 is the main driving shaft of the machine and is provided with a fixed pulley 188 and a loose pulley (not shown) for the usual power-driven belt (not shown).

The main shaft 187 has also fixed to it a gear meshing with a gear 190 (Fig. 1) for continuously driving a gear 191 fast on the shaft 192 of the upper feeding and skiving roll 4. The upper horizontal stretch of the conveyor chain 3a occupies a groove or channel 193 (Fig. 4) on top of the bed plate 194 by which the chain is supported and guided. The end of this plate toward the measuring devices is made with a narrow grooved horn or extension which occupies a central position between the two calipering casters and has a free end which projects close to the feed rolls 1 and 1a so that the horizontal stretch of chain 3a is supported throughout approximately its entire length, as more fully shown in United States Patent No. 2,187,204.

Referring to Fig. 3, the stops 118 for the frame 90 are carried by threaded sleeves 200 mounted on a shaft 201 having right and left threads. The shaft 201 is journaled in suitable bearing in the frame of the machine and collars (not shown) are provided to prevent axial movement.

A knurled knob 202 is fast on shaft 201 to provide means for rotating the shaft and adjusting the position of the stops 118 which are set to accord with the width of the blanks being operated upon.

After a blank has been marked, evened or otherwise graded, it is necessary to restore the rack bar 77 to its original position ready for another blank, with the spring 163 under tension. This is accomplished by means actuated by the feeding mechanism. As already explained, the removal of a finished blank from the machine, thereby allowing trip arm 7 to fall, results in rocking the shaft 20 (Fig. 1) first to the right and then to the left to impart a single reciprocation to feed pawl 6. Fixed to one end of rock shaft 20 outside of the frame of the machine is an arm 205 to which is attached one end of a chain 206 whose opposite end is attached to a pulley 207 fast on shaft 81. When shaft 20 is rocked to the right it acts through arm 205, chain 206 and pulley 207 to turn shaft 81 to the left, thereby turning gear 80 to the left and acting through rack 79 to shift rack bar 77 to its initial position at the left with the spring 133 under tension. During this return movement of rack bar 77 the pawls 165 click or trail idly over the teeth of ratchet 166 but engage and hold the ratchet and the bar 77 against movement toward the right. When the arm 205 swings back to the left at the conclusion of its single reciprocation the chain 206 is slack, as shown in Fig. 1, thus leaving the rack bar 77 and associated parts free to be adjusted during the detecting and measuring operation.

When the rear or trailing end of the blank passes out from beneath the presser bar 3 the spring 58 (Fig. 1) acts through the connections already described to restore the presser bar to its normal depressed position and to release the locking mechanism 150—155. Thereupon the spring 146 restores the slide bars 144, 134, the abutment arm 88, and link 120 to their normal positions. At the time when the rear end of the blank moves out from under the presser bar 3 and the latter falls, as just described, the blank is between the feeding and skiving rolls 4 and 4a. Under these conditions the transverse slide bar 63 is clamped immovably by the pressure of the lower wedge blocks 65 against the upper wedge blocks 66, and the wedge-carrying slide bar 63 remains locked against displacement until the blank is discharged from between rolls 4 and 4a. At this time also the pawls 165 are in holding engagement with the rack 166 so that when the blank is discharged from between rolls 4 and 4a and the pressure between the upper and lower wedges 66, 65 is relieved, the rack bar 77 will still be locked by pawls 165 against further movement toward the right.

The upper feed roll 1 (Figs. 1 and 10) has its shaft 133 journaled in boxes 211 mounted to slide in vertical ways provided on the frame of the machine, these boxes being yieldingly urged downwardly by springs 212. The upper ends of the springs 212 bear against abutment screws 214 which are adjustable to regulate the pressure of the springs. The continuously driven shaft of the lower feed roll 1a is journaled in fixed bearings on the frame of the machine and carries gears which mesh with driving gears on shaft 133 of the upper roll.

The operation of the machine is as follows:

Assume that the grading of a blank has just been completed and that the blank has been discharged from the skiving rolls 4 and 4ᵃ and still rests underneath and supports the trip 7 at the outgoing end of the machine. Under these conditions the feed pawl 6 will be in its extreme retracted position; the presser bar 3 will be in its depressed or lowermost position and through link 57 holds the locking mechanism in released position; the trip 168 will also be in its lowermost or depressed position in the path of the blanks, thereby holding the push rod 172 elevated and the locking pawls 165 in engagement with ratchet 166 on slide bar 77; and the slide bar 77 will stand in a position shifted to the right to the extent determined by the measurement of the outgoing blank.

When the outgoing blank is removed from underneath trip 7, the single-rotation-and-stop clutch 30 on shaft 24 is operated to impart to the feed slide a single reciprocation. At the same time the rack bar 77 is shifted by the movement of the feed-operating mechanism to its extreme position at the left, with the spring 163 under tension, and is there held by locking pawls 165. The frame 99 supporting the calipering rolls 2 and 2ᵃ will be held by their springs 116 against the stops 118 and the lever arm 131 will be in position to lift link 120 upon the entrance of a sole between feed rollers 1 and 1ᵃ. The lowermost blank in the hopper H is fed forward by the feed pawl 6 from the bottom of the stack S into the nip of the feed rolls 1 and 1ᵃ, which seize the blank and advance it to the conveyor chain 3ᵃ and between the two pairs of calipering rolls 2 and 2ᵃ, carried by the two casters swiveled on frames 90, which are spread apart by the advancing blank.

At substantially the same time when the advance end of the blank enters between the calipering rolls it engages the forward end of the presser bar 3 and swings the bar 3 bodily to the right and slightly upward far enough for the blank to pass underneath it. This movement of the presser bar 3 acts through link 57 to operate the locking mechanism 150—155 and through the lever arm 131 to release the link 120. This starts the effective measuring of the blank substantially simultaneously with the entry of the leading end of the blank between the detecting and calipering rolls, and therefore calipers the blank from its extreme forward end. So long as the locking mechanism operates, the measurement of successively thinner spots in the blank encountered by the calipering rolls 2 and 2ᵃ will be transmitted to the slide bar 144 since it is free to respond to any downward movement of the calipering rolls 2, but any upward movement of calipering rolls 2 in response to thicker regions of the blank will not be transmitted. Movement of slide bar 144 sets the stop arm 88 which preserves the measurement of the thinnest spot determined by the calipering rolls 2, 2ᵃ.

As the blank advances through the machine, propelled by the conveyor chain 3ᵃ, against which it is firmly held by the yielding spring-pressed presser bar 3, it next encounters and lifts the trip roll 168 on trip arm 167. As the trip roll 168 rides up on top of the blank, it depresses the push rod 172, thereby disengaging pawls 165 from ratchet 166 and permitting the power-transmitting rack bar 77 to shift to the right under the influence of spring 163 until it is arrested by the engagement of the stop 86 with the stop 88. This action of the rack bar 77 terminates the measuring operation and adjusts and sets the grading devices (evening and stamping mechanisms) through slide bar 63 in accordance with the measurement of the thickness of the thinnest part of the blank as determined by either of the two calipering devices. If any variations in thickness of the blank are subsequently encountered by the calipering rolls 2, 2ᵃ, in that part of the blank which has not yet passed between the calipering rolls, such variations will not affect the measurement setting and transmission mechanisms, since the stop arm 88 cannot be further adjusted because it is now held under the control of the more dominant and powerful spring 163, nor can the link 120 be further lowered in response to thinner areas encountered in the blank since the bar 134 and associated parts are subject to the control of stop arms 86, 88.

Upon the further advance of the blank through the machine it next encounters trip 60 and depresses the same, thereby actuating the stamping device by which the type wheel is forced down on top of the blank and impresses thereon the appropriate grade mark, the type wheel having been previously adjusted into position by the slide bar 63 upon the operation of the trip 168.

The blank next enters between the feeding and skiving rolls 4 and 4ᵃ, whose abutment wedge blocks 66 were also adjusted by the slide bar 63 according to the ascertained grade measurement when the trip 168 was actuated, and the blank is skived or evened down by the knife blade 5 to a uniform thickness corresponding to the ascertained measurement of its thinnest spot.

When the rear or trailing end of the blank passes out from under trip 168 the latter falls again to the bed plate and permits the locking pawls 165 again to engage ratchet 166; and when the blank passes out from underneath the presser bar 3 the latter also swings downwardly and to the left to its lowermost or depressed position, thereby releasing the locking mechanism 150—155 and restoring the link 120 and lever 131. This, however, will not disturb the adjustment of the grading devices since, as already explained, the slide bar 63 will be held against displacement by the clamping of the wedge blocks 65 and 66 so long as a blank is between the rolls 4 and 4ᵃ, and also by the locking pawls 165.

After the blank has been discharged from between the skiving rolls 4 and 4ᵃ it is withdrawn from underneath trip 7, either manually or automatically, and the cycle of operations just described is repeated with repect to the next succeeding blank.

In the embodiment shown in Figs. 15 to 21 the grading means comprises a visual indicator I associated with the calipering rolls and measurement transmission mechanism also substantially of the same construction as that of the previously described embodiment, and the same reference characters are applied to the same or corresponding parts. In this embodiment the soles may be either automatically or manually fed to the machine and removed by hand and segregated in accordance with the grade measurements noted on the visual indicator which is rigidly secured to an upstanding bracket 300 (Figs. 15 to 17) fixed to the machine frame.

The sole to be measured is first presented to the continuously driven feed rolls 1 and 1ᵃ which deliver it to the calipering rolls 2, 2ᵃ and a pair of conveyor belts 3ᵇ carries the sole forwardly, presenting it to a second pair of feed rolls 4 and 4ᵃ which propel it outwardly a distance sufficient to permit its forepart to be grasped by the operator.

The feed rolls 1, 1a are freely rotatable on the shafts 133 and 133a, respectively, the shaft 133 being journaled in boxes 211 (Fig. 16) mounted to slide in vertical ways secured to the machine frame and the shaft 133a being journaled in fixed bearings in the machine frame. The feed rolls 4 and 4a are fast to shafts 192 and 27, respectively, the shaft 192 being journaled in boxes slidable in vertical ways in the machine frame and the shaft 27 being journaled in fixed bearings in the machine frame. The inner ends of the upper feed rolls 1 and 4 are provided with grooved pulleys 301 (Fig. 17) which carry the V-shaped conveyor belts 3b or other suitable form of conveyor, and the outer ends of the lower feed rolls 1a and 4a are provided with sprocket wheels 302 (Fig. 17) which carry drive chains 303. The shaft 27 is provided with a sprocket wheel 304 which is connected by drive chain 304a to ratiometer M (Figs. 15 and 17), the operation of which may be controlled in any suitable manner. Thus the upper and lower feed rolls are continuously driven in unison and are operative to convey soles to be measured through the machine at a predetermined rate of travel.

The lever arm 131 is fast to the shaft 133 and is normally urged inwardly by the spring 132 (Fig. 15) so that its upper end is held in a position to engage and support the bracket 130 carried by the link 120 of the measurement transmission mechanism. As a sole is fed to the rolls 1 and 1a the shaft 133 is raised, thereby elevating the link 120 to its uppermost position, as in the previously described embodiment. A horizontally extending arm 305 is rigidly secured to the lever arm 131 and this arm carries a "startgrading" roll 306 and another roll 307, both of which are adjustably mounted so that their respective positions along the arm 305 may be varied, the construction and arrangement of parts being such that both rolls are in a position to be engaged and raised by a sole passing through the machine. As here shown, the startgrading roll 306 is positioned between the calipering roll 2, 2a and the feed rolls 4, 4a, and the roll 307 is positioned rearwardly of the feed rolls 4, 4a, as illustrated in Fig. 15. With this construction and arrangement the forepart of a sole passing through the machine first elevates the feed rolls 1 and subsequently raises the roll 306, thus causing the arm 305 to swing arm 131 from beneath the bracket 130, in which position the arm 131 is held until the trailing end of the sole passes from beneath the roll 307, whereupon the arms 131 and 305 are swung back to normal position under the influence of spring 132. It will be observed that until the forward end of the sole has caused the actuation of the lever arm 131, the link 120 remains unresponsive to the operation of the calipering rolls 2, 2a, and hence by adjusting the position of roll 306 along the arm 305, the grading operation may be commenced at any specified part of the sole.

The shaft 133 is formed with an extension 308 which projects outwardly beyond the machine frame (Fig. 17) and an arm 310 (Figs. 16 and 17) is rigidly secured thereto so as to swing in response to rocking of the shaft 133. An upwardly extending link 311 connects the arm 310 with a rack bar 312 (Fig. 21) constituting a part of the indicating mechanism I, and a depending arm 314 is pivotally secured at 315 to the arm 310, the arm 314 being operatively associated with a clutch mechanism 316 adapted to control the feeding of soles to the machine in the manner hereinafter described.

A "stop-grading" tripper 320 (Fig. 15) is adjustably secured to shaft 133a with its nose-like end 321 normally projecting into the path of travel of a sole blank being fed by rolls 1, 1a to the calipering rolls 2, 2a, so as to be depressed thereby with consequent rocking of shaft 133a. One end of shaft 133a is provided with an extension 322 (Fig. 16) which projects outwardly beyond the machine frame and rigidly supports a horizontally extending arm 324. An upwardly extending link 325 connects the end of arm 324 with a rack bar 326 which also constitutes a part of the indicating mechanism I, and a tension spring 328 (Fig. 17), one end of which is connected to the machine frame and the other end to the link 325, urges the latter upwardly and normally maintains the tripper 320 with its nose projecting into the path of travel of a blank sole passing through the machine.

When the leading end of a sole operates the tripper 320, the shaft 133a is rocked in a clockwise direction as viewed in Fig. 15 (a counterclockwise direction as viewed in Fig. 16), thereby swinging arm 324 and moving the link 325 downwardly to effect a partial release of the locking mechanism (hereinafter described) of the indicator I, and when the trailing end of the sole passes beyond the tripper 320 the spring 328 becomes effective to restore the parts to normal position. It will be noted that since the position of the nose 321 of the tripper may be varied longitudinally of the path of travel of the sole blank, the stop-grading means, as well as the startgrading means, is subject to adjustment so that the thinness measurement of the sole may be confined to any desired part of its entire length.

As previously indicated, the calipering rolls 2, 2a, the link 120 and associated parts, are substantially identical to those of the previously described embodiment, but the grading mechanism and its connection with the link 120, although similar in principle, differ in construction. In this embodiment vertical downward movement of the link 120 is transmitted directly through the roller 137 (Figs. 15, 17 and 20) to the indicating mechanism I by means of an L-shaped bar 330 which is maintained in engagement with the lower face of the roller 137 by action of spring 350. The bar 330 is slidably mounted in the frame or casing 331 (Figs. 17 and 20) of the indicating mechanism and its upper end portion is formed with rack teeth 332 which mesh with gear 334 integral with stub shaft 335 suitably journaled in an opening in the casing 331. The outer end of the shaft 335 projects beyond the casing 331 and adjustably secured thereto is a gear 336 (Figs. 15 to 18) which meshes with a pinion 337 adjustably secured to dial shaft 338 which is mounted in suitable openings in the casing 331. One end of the shaft 338 carries an indicator pointer or hand 339 which cooperates with dial 340 rigidly secured to the casing 331. The dial 340 may be graduated in irons and fractions thereof, or in any other desired units.

The opposite end of shaft 338 is integral with a gear 342 (Figs. 18 and 21) which meshes with rack teeth 343 cut in one end of a cylindrical slide bar 344 mounted in suitable openings in the casing 331. A gear 345 is rotatably mounted on slide bar 344 adjacent to the inner end of the rack teeth 343 and this gear meshes with teeth 346 cut in the upper end of the rack bar 312

(Fig. 21), and adjacent to its opposite end a gear 348 is rotatably mounted on slide bar 344, the gear 348 meshing with teeth 349 cut in the rack bar 326. The slide bar 344 is at all times urged outwardly toward the right (Fig. 18—toward the left in Fig. 21) by a spring 350 secured at one end to the bar 344 and at its opposite end to a bracket 351 bolted to the frame 331.

Between the gears 348 and 349 is a housing 355 for a releasable locking mechanism for the slide bar 344. This locking mechanism comprises a sleeve or hub 356 integral with gear 345 and formed at its inner end with left-hand threads 357 (Fig. 21) and a corresponding sleeve or hub 358 integral with gear 348, but formed at its inner end with right-hand threads 359. Fixed within the housing 355 is a pair of oppositely disposed cups 361 and 362 having threaded openings in their outer ends which respectively receive the threaded ends 357 and 359 of the sleeves. The inner surfaces 363 and 364 of the cups are conical shaped, as shown in Fig. 21, and the inner ends of the cups are maintained in spaced relation by a collar 365. Ball bearing members 367 are disposed about the slide bar 344 so as to be engageable with the end of sleeve 356 and the inclined or conical surface 363, and a second group of ball bearing members 368 are similarly positioned within the cup 362 so as to be engageable with the end of sleeve 358 and inclined on conical surface 364. The ball bearing members 367 and 368 are normally maintained in engagement with the adjacent conical surfaces by washers 369 and 370 which are loosely mounted on the slide bar 344 and yieldingly held against the ball bearing members by a compression spring 372 surrounding slide bar 344.

It will be noted that with this construction and arrangement the slide bar 344 is normally locked by balls 368 against movement toward the right (Fig. 21), but the balls 367 are spaced from the adjacent inclined surface 363 and hence permit the bar 344 to be moved toward the left under the influence of spring 350 subject to the dominating action of springs 110 associated with the calipering rolls 2, 2ª. When a sole is presented to the feed rolls, 1, 1ª the shaft 133 is elevated, thus causing the arm 131 and associated parts to be raised a distance corresponding to the thickness of the sole. The elevation of the link 120 and associated parts permits the bar 330 to move upwardly under the influence of spring 350 and consequently the pointer 339 is swung to a position corresponding to the thickness of that part of the sole between the rolls 1, 1ª. When the sole encounters trip 320 the latter is depressed, thereby rocking shaft 133ª and extension 322, thus causing link 325 to move downwardly to rotate gear 348 in a clockwise direction as viewed from the right in Fig. 21, which action causes the balls 368 to be urged inwardly to unlock the bar 344. The bar 344 is thus completely released.

As the sole moves inwardly it passes between the calipering rolls 2, 2ª which have been previously separated by the feed rolls 1, 1ª and thereafter the sole operates the start-grading trip 306 which rocks shaft 133 to effect release of the link 120 and simultaneously raises the link 311 which causes gear 345 to rotate in a counterclockwise direction as viewed from the right in Fig. 21, thereby permitting the balls 367 to move inwardly under the influence of spring 372, thus locking the bar 344 against movement toward the left (Fig. 21). With the link 120 released, the rolls 2, 2ª are now free to caliper the sole and as the rolls encounter successively thinner spots along the edges of the sole, the measurements are transmitted to and recorded on the indicator I.

When the trailing end of the sole passes by the stop-grading trip 320, the latter is returned to normal position and shaft 133 is rotated in a clockwise direction as viewed in Fig. 16, which rotation raises link 325 to cause gear 348 to rotate in a clockwise direction as viewed from the left in Fig. 21, thus permitting the balls 368 to move outwardly under the influence of spring 372 to lock the bar 344 against movement toward the right. Locking the bar 344 by the balls 367 and then by the balls 368 not only preserves the minimum thickness transmitted to and recorded on the indicator I, but also locks the entire system and hence measurements of thinner spots encountered by the rolls 2, 2ª will not be transmitted to or recorded on the indicator. When the sole is manually withdrawn from beneath the roll 307, the arm 305 drops back to normal position, rotating shaft 133 in a clockwise direction (Fig. 15), thereby drawing the link 311 downwardly to effect release of balls 367 and simultaneously restoring the lever arm 131 to normal position beneath the bracket 130. With the parts thus positioned the machine is ready to receive the next sole to be calipered.

As previously indicated, the operation of the machine shown in this particular embodiment may be either manual or semi-automatic, as hereinafter described, in which case feeding means responsive to the removal of a sole from beneath the roll 307 may be employed. Although any of the various types of feeding means known to the art may be used, the mechanism here shown by way of example is substantially identical to that shown in United States Patent No. 1,945,858, granted February 6, 1934, to which reference may be had for a complete description.

During the cycle of the grading operation wherein the link 311 is moved upwardly, the arm 314 is raised so as to set or "cock" the clutch mechanism, and when the sole is removed from beneath the roll 307 the link 311 and arm 314 are moved downwardly, which action causes the clutch to operate in the manner described in United States Patent No. 1,945,858.

The semi-automatic feeding mechanism may, as here shown (Figs. 22 and 23), operate in conjunction with means for automatically spreading the calipering rolls 2, 2ª so as to receive the leading end of the blank as it emerges from the feed rolls 1, 1ª, thus insuring a smoother operation than otherwise possible. The feeding mechanism includes a magazine H (Fig. 22) for holding a stack of soles B which are fed one at a time to the feed rolls 1, 1ª by a mechanism substantially identical to that disclosed in Patent No. 1,945,858. The feeding mechanism is operated by the clutch 316 through the crank arm 401 which reciprocates the link 402 connected by an adjustable coupling 403 to a slide bar 404 which actuates the feeding pawl 405. The inner end of the slide bar 404 is slidably supported by a depending bracket 406 and is positioned so as to engage and actuate the spreading mechanism 408 for the calipering rolls during each forward movement of the feeding cycle.

The spreading mechanism comprises a generally T-shaped casting 409 secured to or integral with the transverse frame member 94, it being noted that the spreading mechanism takes the place of the adjustable shaft 201 and associated parts shown in the previously described embodiments. The arms of the casting are formed with aligned grooves 410, 411 and the stem is formed with a groove 412 in which a block or crosshead 414 is slidably mounted. The ends of a pair of arms or links 415, 416 are pivotally secured by pins 417, 418 to the block 414 and thus provide a toggle-link arrangement. The opposite ends of links 415, 416 carry pins 420 and 421 on which rollers 422 and 423 are mounted so as to ride in the grooves 410 and 411, respectively. The pins 420, 421 project upwardly so as to be engageable, respectively, with the inner faces of pins 424 and 425 which project outwardly from the yokes or frame members 90 supporting the calipering rolls 2, 2ª.

When the trailing end of a blank has passed from between the calipering rolls 2, 2ª, the springs 116, as above explained, normally hold the yokes 90 in their position of closest approach and hence likewise hold the links 415, 416 together, as shown by the solid lines of Fig. 22, thereby normally holding the block 414 in its outermost or retracted position. When the blank has passed through the machine so that its trailing end is held by the rolls 4, 4ª, the feed pawl 405 is in retracted position (Fig. 22), as explained in Patent No. 1,945,858, and hence the inner end of the slide bar 404 is held spaced from the block 414, as shown by the solid lines of Fig. 22. In response to the removal of the blank from between the rolls 4, 4ª, the clutch mechanism 316 operates to reciprocate the link 402 which actuates the feed pawl 405 and simultaneously carries the end of the slide bar 404 into engagement with the block 414 to push it inwardly. Inward movement of the bar 404 effects outward movement of the ends of link 415, 416 and, as illustrated by the full lines of Fig. 23 and the broken lines of Fig. 22, thus spreads the yokes 90 apart a distance sufficient to receive the leading end of the blank which is being fed forwardly to the rolls 1, 1ª which, in turn, feed the blank to the calipering rolls 2, 2ª. When the clutch mechanism 316 has completed one cycle and the feed pawl 405 has been returned to its normal retracted position, the links 415, 416 and block 414 are then free to be returned to normal position, and hence do not interfere with the movements of the yokes 90 and associated parts in calipering the marginal portions of the blank B. When the trailing end of the blank passes from between the two calipering rolls 2, 2ª, the yokes 90 return to their position of closest approach under the influence of springs 116 and thus move the links 415, 416 inwardly to restore them to normal position.

It will be observed that the distance which the yokes 90 are spread is governed by the magnitude of inward movement of the block 414 which, in turn, is governed by the position of the inner end of the slide bar 404, relative to the outer end of block 414. Accordingly, by varying the distance between these parts, the time and period of contact during each cycle may be varied so as to secure any desired movement of the block 414 with consequent control of the spreading of the yokes 90. To this end, the coupling 403 is adjustable longitudinally of the slide bar 404, and a series of openings 430 is formed in the slide bar to permit repositioning of the lower end of the feed pawl 405 when the normal position of the slide bar is adjusted endwise. It is to be understood that in all material particulars the feeding mechanism is substantially identical to that shown in Patent No. 1,945,858, and that the grading mechanism is identical to the embodiment shown in Figs. 15 to 21.

While I have shown and described several desirable embodiments of the invention, it is to be understood that this disclosure is for the purpose of illustration, and that various changes in shape, proportions and arrangement of parts, as well as the substitution of equivalent elements for those herein shown and described, may be made without departing from the spirit and scope of the invention as set forth in the appended claims.

I claim:

1. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means and transmission mechanism for adjusting the grading means, the transmission mechanism being controlled by the setting mechanism but actuated independently thereof, said setting mechanism including a controller member to govern the extent of movement of the transmission mechanism and grading means, and controller operating mechanism adapted to impart to the controller member adjustments proportional in extent to the various measuring positions of the measuring means.

2. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means and transmission mechanism for adjusting the grading means, the transmission mechanism being controlled by the setting mechanism but actuated independently thereof, said setting mechanism including a controller member to govern the extent of movement of the transmission mechanism and grading means, and controller operating mechanism including a bar parallel to the plane of the blank and supported for such movement that all positions of the bar are parallel to one another, through which bar adjustments are imparted to the controller member proportional in extent to the various measuring positions of the measuring means.

3. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means and transmission mechanism for adjusting the grading means, the transmission mechanism being controlled by the setting mechanism but actuated independently thereof, said setting mechanism including a controller member to govern the extent of movement of the transmission mechanism and grading means, and controller operating mechanism comprising a parallel linkage system including a link movable in a fixed path so that its movement corresponds to the thickness grade of the blank being calipered, and means responsive to the movement of the movable link for setting said controller member.

4. In a grading machine of the type having measuring means to determine the thickness grades of successive blanks of stocks and grading means adapted to be adjusted in accordance with the thickness grades of the blanks as determined by the measuring means, the combination of setting mechanism responsive to the measuring means and transmission mechanism for adjusting the grading means, the transmission mechanism being controlled by the setting mechanism but actuated independently thereof, said setting mechanism including a controller member to govern the extent of movement of the transmission mechanism and grading means, and controller operating mechanism comprising a four-bar linkage having a link movable toward and away from the path of travel of the blank being calipered and arranged so that its vertical component of movement corresponds to the thickness grade of the blank, and means responsive to the vertical component of movement of said link for setting said controller member.

5. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means and transmission mechanism for adjusting the grading means, the transmission mechanism being controlled by the setting mechanism but actuated independently thereof, said setting mechanism including a controller member to govern the extent of movement of the transmission mechanism and grading means, and controller operating mechanism comprising a parallel linkage system, including a link movable only in response to successively thinner measurements indicated by said measuring means, and means responsive to the movement of the movable link for setting said controller member.

6. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means for controlling the adjustment of the grading means, said setting mechanism having a locking device to preserve only successively thinner measurements detected by the measuring means comprising a fixed element and a movable means comprising a fixed element and a movable element defining between them two opposed and relatively inclined surfaces and a movable wedging member interposed between said inclined surfaces and adapted to restrain movements of the movable element in a direction responsive to thicker measurements found by the measuring means but to permit movements of the movable element in a direction responsive to thinner measurements found by the measuring means.

7. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means for controlling the adjustment of the grading means, said setting mechanism including a controller member to govern the extent of movement of said grading means, and a locking device to preserve only successively thinner measurements detected by the measuring means, comprising a slide mounted to move endwise in accordance with the thickness measurements determined by said measuring means, an element defining with the said slide relatively inclined surfaces and movable wedging means interposed between said inclined surfaces so as to restrain movement of said slide in one direction, means responsive to the passage of a blank along predetermined points in its path of travel for controlling the operation of said wedging means, and means connecting said slide and controller member and operative to set the latter to correspond with the ultimate position of said slide.

8. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means for controlling the adjustment of the grading means, said setting mechanism including a controller member to govern the extent of movement of said grading means, and a locking device to preserve only successively thinner measurements detected by the measuring means, comprising an elongate slide associated with said measuring means and movable endwise to assume an ultimate position corresponding to the thickness grade determined thereby, means defining an inclined surface spaced from said slide and rotatable bearing elements interposed between said inclined surface and slide so as to restrain movement of said slide, thereby to preserve the measurement transmitted thereto, and means connecting said slide and controller member so as to set the grading means to correspond with the ultimate position of said slide.

9. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means for controlling the adjustment of the grading means, said setting mechanism including a controller member to govern the extent of movement of said grading means, and a locking device to preserve only successively thinner measurements detected by the measuring means, comprising an elongate slide associated with said measuring means and movable endwise to assume an ultimate position corresponding to the thickness grade determined thereby, said slide having a substantially planar surface, means defining an inclined surface spaced from said planar surface, a roller bearing interposed between said inclined surface and planar surface and operative to restrain movements of said slide so as to preserve the thickness measurement transmitted thereto by said measuring means, and means connecting said slide and controller member and operative to set the latter to correspond with the ultimate position of said slide.

10. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means for controlling the adjustment of the grading means, said setting mechanism having a locking device to preserve only successively thinner measurements detected by the measuring means comprising an elongate cylindrical slide associated with said measuring means and movable endwise to assume an ultimate position corresponding to the thickness grade determined thereby, a sleeve circumposed about said slide and formed with a conical interior surface, a plurality of ball bearing elements interposed between said slide and conical surface and operative to restrain movement of said slide so as to preserve the measurement transmitted thereto by said measuring means, and measurement transmitting means connecting said slide and grading means and operative to set the latter to correspond with the ultimate position of said slide.

11. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means for controlling the adjustment of the grading means, said setting mechanism comprising an elongate slide associated with said measuring means and movable endwise to assume an ultimate position corresponding to the thickness grade determined thereby, locking means including a member cooperating with said slide so as to define relatively inclined surfaces and movable wedging means interposed between said inclined surfaces and operative to restrain movement of said slide in one direction, releasable means for holding said wedging means in slide-locking position, trip means operable by a blank when passing a predetermined point in its path of travel for moving said wedging means away from slide-locking position, thereby to permit said slide to respond to the operation of said measuring means, and means connecting said slide and grading means and operative to set the latter to correspond with the ultimate position of said slide.

12. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means for controlling the adjustment of the grading means, said setting mechanism comprising an elongate slide associated with said measuring means and movable endwise to assume an ultimate position corresponding to the thickness grade determined thereby, locking means including a member cooperating with said slide so as to define relatively inclined surfaces and movable wedging means interposed between said inclined surfaces and operative to restrain movement of said slide in a direction indicating thicker measurements, mechanism operative to release said wedging means and move said slide in a direction indicating thicker measurements, means operative at a predetermined point in the path of travel of said blank for moving said wedging means to slide-locking position, thereby to permit said slide to respond only to the operation of said detecting means indicating successively thinner measurements, and means connecting said slide and grading means and operative to set the latter to correspond with the ultimate position of said slide.

13. In a grading machine of the type having measuring means to determine the thickness grades of successive blanks of stock and grading means adapted to be adjusted in accordance with the thickness grades of the blanks as determined by the measuring means, the combination of setting mechanism responsive to the measuring means for controlling the adjustment of the grading means, said setting mechanism comprising an elongate slide associated with said measuring means and movable endwise to assume an ultimate position corresponding to the thickness grade determined thereby, holding means effective to restrain movement of said slide in a direction indicating thinner measurements, locking means including a member cooperating with said slide so as to define relatively inclined surfaces and movable wedging means interposed between said inclined surfaces and operative to restrain movement of said slide in a direction indicating thicker measurements, means operative as a blank is presented to said measuring means for releasing said holding means and moving said slide toward a position indicating thicker measurements, means operative at a predetermined point in the path of travel of said blank for moving said wedging means to slide-locking position, thereby to permit said slide to respond only to the operation of said detecting means indicating successively thinner measurements, and mechanism connecting said slide and grading means and operative to set the latter to correspond with the ultimate position of said slide.

14. In a grading machine, calipering members adapted to receive a sole to be measured, measurement-transmitting mechanism comprising a parallel linkage system having a link supported to move toward and away from the path of travel of a blank as it is being calipered, said link being associated with one of the calipering members so as to respond to successively thinner measurements detected by the calipering members and assume an ultimate position corresponding to the minimum thickness detected, means operative to elevate said link to a position corresponding to a maximum thickness of the leading end of the blank being calipered, means operative as the blank passes a predetermined point in its path of travel for releasing said link from elevated position so that it may respond to the operation of said caliper members, and grading means operatively connected with said link so as to be set to correspond to the ultimate position of the latter.

15. In a grading machine, a measuring member adapted to engage the marginal area only of a blank to be measured, a frame on which said measuring member is mounted, and means for supporting said frame for movement toward and from the path of travel of the blank comprising a fixed track extending transversely of said path of travel.

16. In a machine of the class described, a measuring member adapted to contact the marginal portions of a blank to be measured, a frame in which said measuring member is mounted, and means for supporting said frame for movement toward and away from the line of travel of said blank, comprising a fixed track extending transversely of the path of travel of said blank and formed with a longitudinally extending groove, a movable track carried by said frame and formed with a groove cooperating with a groove in said fixed track, and ball bearing members mounted in said grooves, the cross-sectional shape of said grooves and size of said ball bearing members being such that the vertical distance between a horizontal plane passing through the centers of the ball bearing members and the point of contact between the ball bearing members and the groove on the fixed track being substantially less than that between the ball bearing members and the point of contact with the groove in the movable track.

17. In a machine of the class described, a measuring member adapted to contact the marginal portions of a blank to be measured, a frame in which said measuring member is mounted, and means for supporting said frame for movement toward and away from the line of travel of said blank, comprising a pair of fixed tracks extending transversely of the path of travel of said blank, movable tracks carried by the upper and lower ends of said frame, each of said tracks being formed with longitudinally extending grooves, and a plurality of ball bearing members mounted in each of the grooves, the cross-sectional shape of the grooves and size of the ball members being such that the vertical distance between a horizontal plane passing through the centers of the ball bearing members and the point of contact between the ball bearing members and the groove on the fixed track being substantially less than that between the ball bearing members and the point of contact with the groove in the movable track.

18. In a grading machine having measuring means to determine the thickness grades of successive blanks of stock and measurement-transmitting mechanism associated with said measuring means, a visual indicator comprising relatively movable cooperating index members for designating the thickness grades of blanks of stock, an elongate slide mounted for endwise movement, said slide being operatively connected with said measurement-transmitting mechanism and said index members so as to set the latter to accordance with the thickness grades determined by the detecting means, and independent releasable locking means acting on said slide and controlling endwise movement thereof, the operation of said locking means being responsive to the passage of a blank being calipered along predetermined points in its path of travel through the machine.

19. In a grading machine having measuring means to determine the thickness grades of successive blanks of stock and measurement-transmitting mechanism associated with said measuring means, a visual indicator comprising a fixed scale, a movable pointer, an elongate slide mounted for endwise movement, said slide being connected with said measurement-transmitting mechanism and said pointer so as to set the latter in accordance with thickness grades determined by said detecting means, and independent releasable locking means acting on said slide and controlling endwise movement thereof, the operation of said locking means being responsive to the passage of a blank being calipered along predetermined points in its path of travel through the machine.

20. In a grading machine having measuring means to determine the thickness grades of successive blanks of stock and measurement-transmitting mechanism associated with said measuring means, a visual indicator comprising relatively movable cooperating index members for designating the thickness grades of blanks of stock, an elongate slide mounted for endwise movement, said slide being operatively connected with said measurement-transmitting mechanism and said index members so as to set the latter in accordance with the thickness grades determined by the detecting means, releasable locking means acting on said slide for restraining endwise movement in one direction, releasable locking means acting on said slide for restraining endwise movement in the opposite direction, and actuating means for successively operating the locking means in response to the passage of a blank being calipered along predetermined points in its path of travel through the machine.

21. In a grading machine having measuring means to determine the thickness grades of successive blanks of stock and measurement-transmitting mechanism associated with said measuring means, a visual indicator comprising relatively movable cooperating index members for designating the thickness grades of blanks of stock, an elongate slide mounted for endwise movement, said slide being operatively connected with said measurement-transmitting mechanism and said index members so as to set the latter in accordance with the thickness grades determined by the detecting means, releasable locking means acting on said slide for restraining endwise movement in one direction, releasable locking means acting on said slide for restraining endwise movement in the opposite direction, each of said locking means comprising a member defining with said slide relatively inclined surfaces and movable wedging means interposed between the inclined surfaces, and means for controlling the movements of said wedging means in response to the passage of a blank being calipered along predetermined points in its path of travel through the machine.

22. In a grading machine having measuring means to determine the thickness grades of successive blanks of stock and measurement-transmitting mechanism associated with said measuring means, a visual indicator comprising relatively movable cooperating index members for designating the thickness grades of blanks of stock, an elongate slide mounted for endwise movement, said slide being operatively connected with said measurement-transmitting mechanism and said index members so as to set the latter in accordance with the thickness grades determined by the detecting means, releasable locking means acting on said slide for restraining endwise movement in one direction, releasable locking means acting on said slide for restraining endwise movement in the opposite direction, each of said locking means comprising a sleeve circumposed about said slide and defining therewith relatively inclined surfaces, a plurality of ball bearing elements interposed between said inclined surfaces and actuating means for urging said ball bearing elements into and out of locking position, and means for operating said actuating means in response to the passage of a blank being calipered along predetermined points of its path of travel through the machine.

23. In a grading machine having measuring means to determine the thickness grades of successive blanks of stock and measurement-transmitting mechanism associated with said measuring means, a visual indicator comprising relatively movable cooperating index members for designating the thickness grades of blanks of stock, an elongate slide mounted for endwise movement, said slide being operatively connected with said measurement-transmitting mechanism and said index member so as to set the latter in accordance with the thickness grades determined by the detecting means, releasable locking means acting on said slide for restraining movement in a direction indicating thicker measurements, means operative upon release of said locking means for moving said slide in a direction indicating thicker measurements, releasing locking means acting on said slide for restraining movement in a direction indicating thinner measurements, and means operative by a blank being calipered for successively operating the locking means so that the slide is free to respond only to successively thinner measurements along a predetermined portion lengthwise of the blank.

24. In a grading machine, measuring means mounted to move transversely of the path of travel of a blank to be measured so as to engage the marginal portions of the blank, means urging said detecting means inwardly and normally holding it at its innermost position, means for feeding the blank toward said measuring means, and means operatively connected with said measuring means and feeding means for moving said measuring means outwardly to receive the leading end of the blank as it is being fed to the measuring means.

25. In a grading machine, a pair of measuring means positioned on opposite sides of the line of travel of a blank to be measured and mounted to move inwardly transversely of said line of travel so as to contact the marginal portions of the moving blank, means urging each of said measuring means inwardly and normally holding them at their positions of closest approach, reciprocating means for feeding a blank to be calipered toward said measuring means, and means operatively connected with said measuring means and reciprocating means for moving at least one of said measuring means outwardly to receive the leading end of the blank as it is being fed to the measuring means.

26. In a grading machine, a pair of measuring means positioned on opposite sides of the line of travel of a blank to be measured and mounted to move inwardly transversely of said line of travel so as to contact the marginal portions of the moving blank, means urging each of said measuring means inwardly and normally holding them at their positions of closest approach, means for feeding a blank to be calipered toward said measuring means, and toggle links connected with said measuring means and feeding means for moving at least one of the measuring means outwardly to receive the leading end of the blank as it is being fed to the measuring means.

27. In a grading machine, two pairs of calipering rolls positioned on opposite sides of the line of travel of a blank to be measured and mounted to move inwardly transversely of said line of travel so as to contact the marginal portions of the moving blank, means urging said rolls inwardly and normally holding them at their positions of closest approach, reciprocating means for feeding a blank toward said calipering rolls, and toggle links connected with said calipering rolls and said reciprocating means for moving the calipering rolls outwardly to receive the leading end of the blank as it is being fed to the calipering rolls.

28. In a grading machine, two pairs of calipering rolls positioned on opposite sides of the line of travel of a blank to be measured, each pair being mounted to move inwardly transversely of said line of travel so as to contact the marginal portions of the moving blank, the rolls of each pair being relatively movable toward and away from each other so as to respond to variations in thickness of the blank and normally in position of closest approach, means urging each pair of rolls inwardly and normally holding them at their respective innermost positions, means for feeding a blank toward said calipering rolls, and means for separating the rolls of each pair a distance corresponding to the thickness of the leading end of the blank and for concurrently moving each pair of calipering rolls outwardly as said blank is being fed thereto.

ARTHUR G. B. METCALF.